(12) United States Patent
Dugat et al.

(10) Patent No.: US 9,988,218 B2
(45) Date of Patent: Jun. 5, 2018

(54) MODULAR HANDLING SYSTEM WITH MULTI-LEVEL SORTER AND METHOD OF USING SAME

(71) Applicant: Robotica, Inc., Cypress, TX (US)

(72) Inventors: Jay Mark Dugat, Cypress, TX (US); Andy Pettit, Malta, OH (US)

(73) Assignee: Robotica, Inc., Spring, TX (US)

( * ) Notice: Subject to any disclaimer, the term of this patent is extended or adjusted under 35 U.S.C. 154(b) by 0 days. days.

(21) Appl. No.: 15/248,967

(22) Filed: Aug. 26, 2016

(65) Prior Publication Data

US 2017/0057756 A1    Mar. 2, 2017

Related U.S. Application Data

(60) Provisional application No. 62/210,310, filed on Aug. 26, 2015, provisional application No. 62/210,348, filed on Aug. 26, 2015.

(51) Int. Cl.
*B65G 47/54* (2006.01)
*B65G 13/10* (2006.01)
(Continued)

(52) U.S. Cl.
CPC ............ *B65G 47/54* (2013.01); *B65G 13/10* (2013.01); *B65G 15/12* (2013.01); *B65G 15/50* (2013.01); *B65G 37/02* (2013.01); *B65G 47/844* (2013.01)

(58) Field of Classification Search
CPC ........ B65G 13/10; B65G 15/12; B65G 15/42; B65G 15/44; B65G 15/50; B65G 47/54; B65G 37/02; B65G 47/844
(Continued)

(56) References Cited

U.S. PATENT DOCUMENTS 1,603,633 A   8/1924   Nelson
1,737,762 A   12/1929   Howe
(Continued)

FOREIGN PATENT DOCUMENTS

DE   2259273      12/1972
WO   2014165281   10/2014
WO   2014165288   10/2014

OTHER PUBLICATIONS

U.S. Appl. No. 14/550,826, Non Final Office Action dated Jul. 29, 2016, 10 pages.
(Continued)

*Primary Examiner* — Leslie A Nicholson, III
*Assistant Examiner* — Keith R Campbell
(74) *Attorney, Agent, or Firm* — JL Salazar Law Firm

(57) ABSTRACT

A multi-level sorter of a handling system for transporting cases. The handling system has conveyors extending between locations of a facility. The multi-level sorter includes a multi-level frame positionable adjacent at least one outlet of at least one of the conveyors, at least one diverter carried by the multi-level frame, and at least one bin supported about at least one of the levels of the multi-level frame. Each of the outlets of the conveyors aligned with a level of the multi-level frame to pass the cases thereto. The diverter has rollers to pass the cases along a main path and crossbands to selectively divert the cases from the main path. Each of the bins is alignable with the diverter to receive the diverted cases therefrom whereby the cases are sorted.

20 Claims, 38 Drawing Sheets

(51) Int. Cl.
  *B65G 15/50* (2006.01)
  *B65G 15/12* (2006.01)
  *B65G 37/02* (2006.01)
  *B65G 47/84* (2006.01)

(58) Field of Classification Search
  USPC .................................................... 198/370.1
  See application file for complete search history.

(56) References Cited

U.S. PATENT DOCUMENTS

| | | | |
|---|---|---|---|
| 2,590,359 A | 3/1952 | Zopf | |
| 2,993,583 A | 6/1958 | Sykes | |
| 3,104,004 A * | 9/1963 | Poel | B65G 47/54 198/367 |
| 3,137,068 A | 6/1964 | Quigley | |
| 3,232,409 A * | 2/1966 | Pierson | B65G 47/54 198/349 |
| 3,944,054 A | 3/1976 | Ensinger | |
| 4,014,428 A | 3/1977 | Ossbahr | |
| 4,192,496 A | 3/1980 | Baselice | |
| 4,200,178 A * | 4/1980 | Gunti | B65G 47/54 198/367 |
| 4,256,213 A | 3/1981 | Shaw et al. | |
| 4,629,302 A | 12/1986 | Willcox | |
| 4,653,961 A | 3/1987 | Hashimoto | |
| 4,715,488 A | 12/1987 | Hewitt | |
| 4,730,718 A | 3/1988 | Fazio | |
| 4,804,081 A | 2/1989 | Lenhardt | |
| 4,962,841 A | 10/1990 | Kloosterhouse | |
| 5,101,703 A | 4/1992 | Tanaka et al. | |
| 5,150,781 A | 9/1992 | Deisenroth | |
| 5,165,516 A | 11/1992 | Reed | |
| 5,172,804 A | 12/1992 | Chersin | |
| 5,217,110 A | 6/1993 | Spangler et al. | |
| 5,351,809 A | 10/1994 | Gilmore | |
| 5,456,348 A | 10/1995 | Whetsel | |
| 5,568,857 A | 10/1996 | Chen | |
| 5,699,892 A * | 12/1997 | Shyr | B65G 47/54 198/370.09 |
| 5,718,325 A | 2/1998 | Doster | |
| 5,854,460 A | 12/1998 | Graf et al. | |
| 5,911,300 A | 6/1999 | Mraz | |
| 5,971,132 A * | 10/1999 | Bonnet | B65G 47/54 198/370.07 |
| 5,984,078 A | 11/1999 | Bonnet | |
| 6,068,111 A | 5/2000 | Smith | |
| 6,073,747 A | 6/2000 | Takino | |
| 6,227,377 B1 | 5/2001 | Bonnet | |
| 6,264,042 B1 * | 7/2001 | Cossey, Jr. | B07C 5/362 198/570 |
| 6,471,031 B1 | 10/2002 | Duncalf | |
| 6,533,096 B2 | 3/2003 | Gilmore | |
| 6,595,349 B2 * | 7/2003 | MacSwan | B65G 47/54 198/370.09 |
| 6,629,018 B2 | 9/2003 | Mondie | |
| 6,719,119 B1 | 4/2004 | Hendzel | |
| 6,782,993 B2 | 8/2004 | Bernard et al. | |
| 6,843,365 B2 | 1/2005 | Baker | |
| 6,907,978 B2 | 6/2005 | Evans | |
| 6,957,736 B2 * | 10/2005 | Bonifer | B65G 15/12 198/583 |
| 7,150,383 B2 | 12/2006 | Talken | |
| 7,261,198 B2 | 8/2007 | Tatar | |
| 7,638,729 B2 | 12/2009 | Park | |
| 7,641,043 B2 | 1/2010 | Vestergaard | |
| 7,909,153 B2 | 3/2011 | Pogue | |
| 8,161,854 B2 | 4/2012 | Fourney | |
| 8,561,790 B2 | 10/2013 | Brayman | |
| 8,684,169 B2 | 4/2014 | Itoh | |
| 8,827,623 B2 | 9/2014 | Stelter | |
| 9,110,773 B2 | 8/2015 | Roush | |
| 9,216,862 B2 | 12/2015 | Wallace | |
| 9,475,653 B2 | 10/2016 | Dugat | |
| 2001/0003939 A1 | 6/2001 | Lui et al. | |
| 2004/0211651 A1 | 10/2004 | Hall | |
| 2004/0226803 A1 * | 11/2004 | Brixius | B65G 47/53 198/370.1 |
| 2007/0125212 A1 | 6/2007 | Hilgendorf | |
| 2007/0162174 A1 | 7/2007 | Doke | |
| 2007/0221471 A1 | 9/2007 | Fourney | |
| 2008/0169171 A1 | 7/2008 | Itoh | |
| 2009/0065327 A1 | 3/2009 | Evangelista | |
| 2009/0113853 A1 | 5/2009 | Porter et al. | |
| 2010/0272961 A1 | 10/2010 | Costin, Jr. | |
| 2014/0041989 A1 * | 2/2014 | Wallace | B65G 47/54 198/369.1 |
| 2014/0290827 A1 | 10/2014 | Heeman | |
| 2014/0346008 A1 * | 11/2014 | Hoynash | B65G 1/04 198/347.1 |
| 2015/0144536 A1 | 5/2015 | Dugat | |
| 2016/0016684 A1 | 1/2016 | Dugat | |
| 2016/0083196 A1 | 3/2016 | Dugat | |
| 2017/0008706 A1 | 1/2017 | Dugat | |

OTHER PUBLICATIONS

News Track Converyor Units Brochure, Mar. 2013, 2 pages.
U.S. Appl. No. 14/859,295, Non Final Office Action dated Mar. 2, 2016, 10 pages.

* cited by examiner

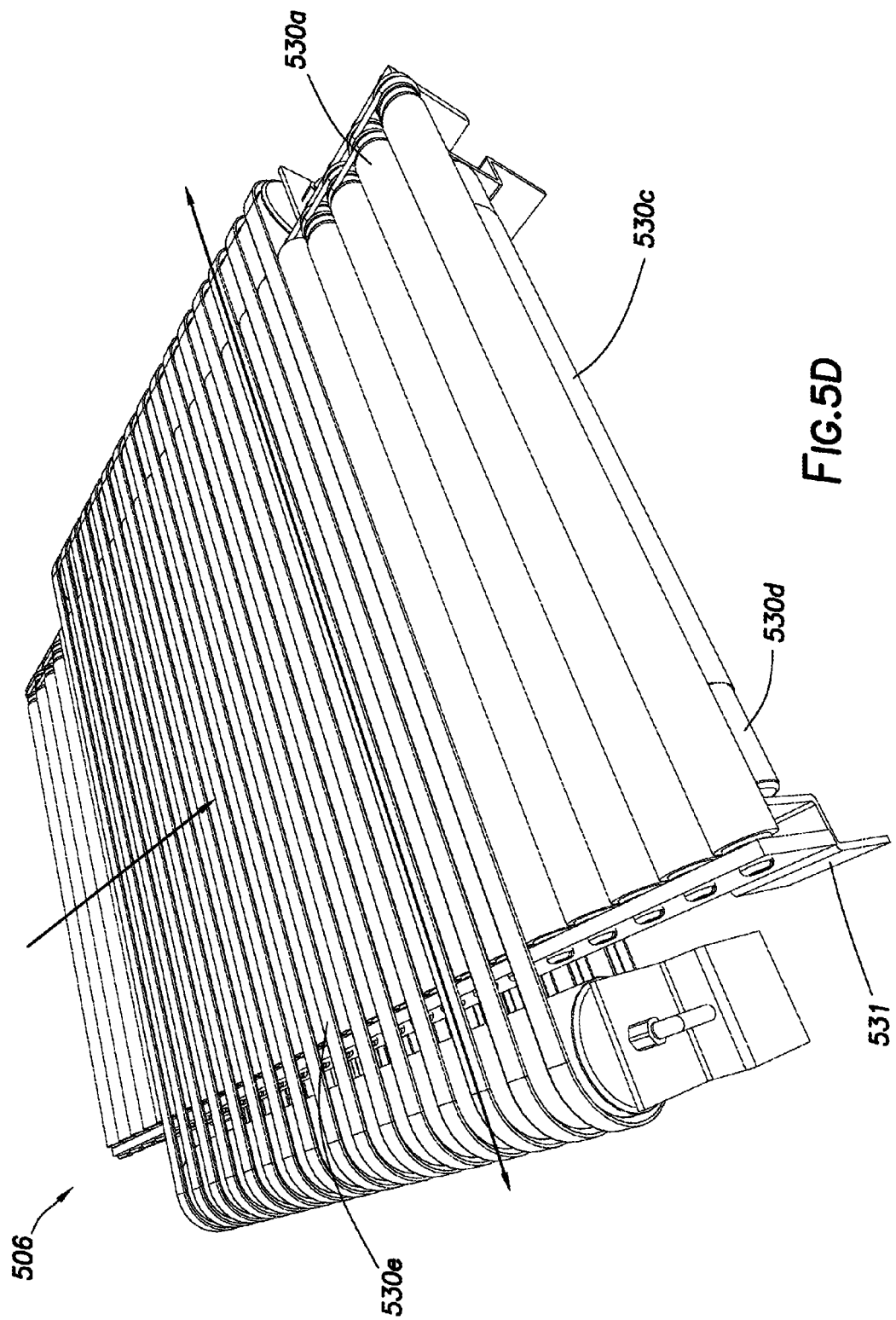

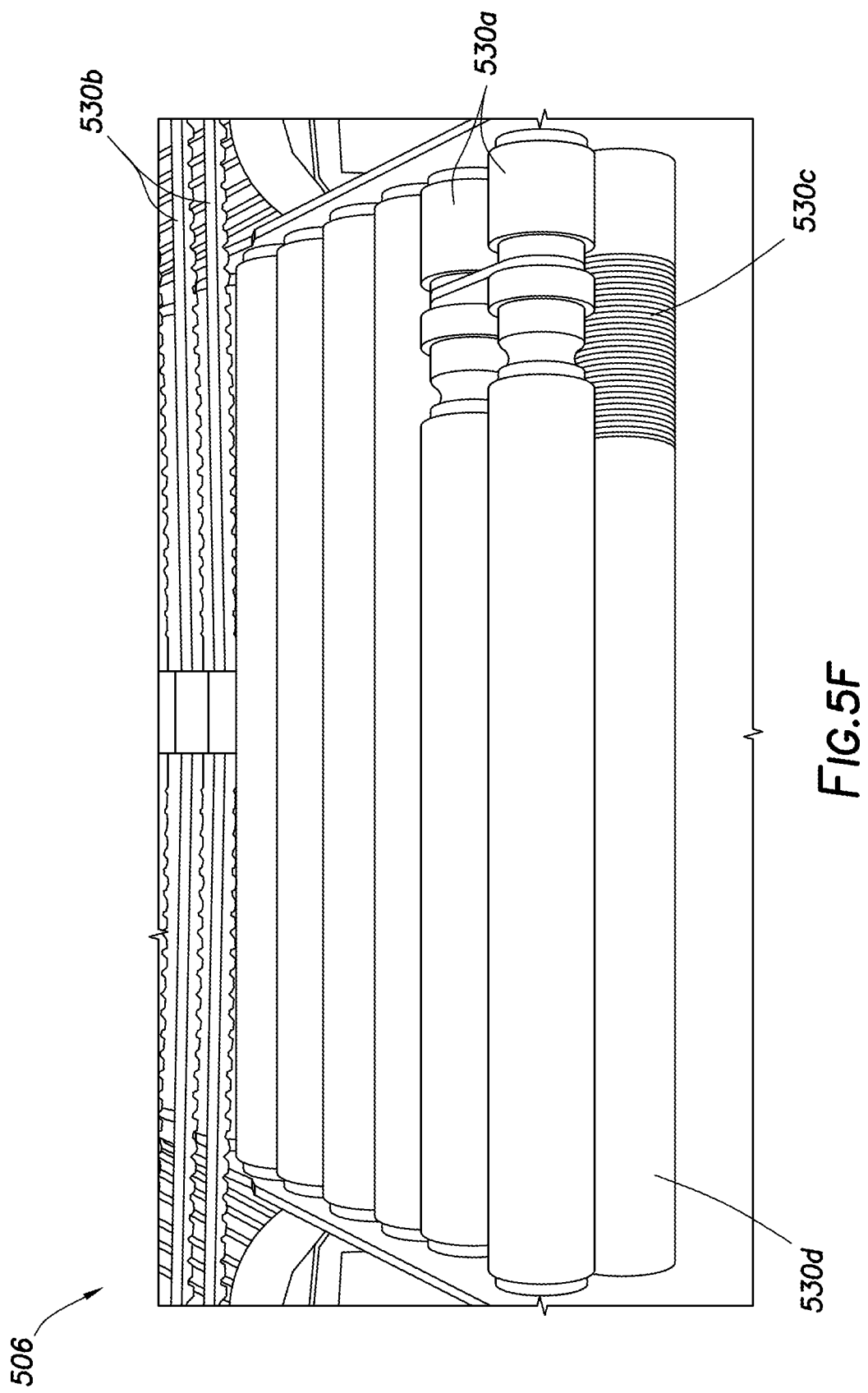

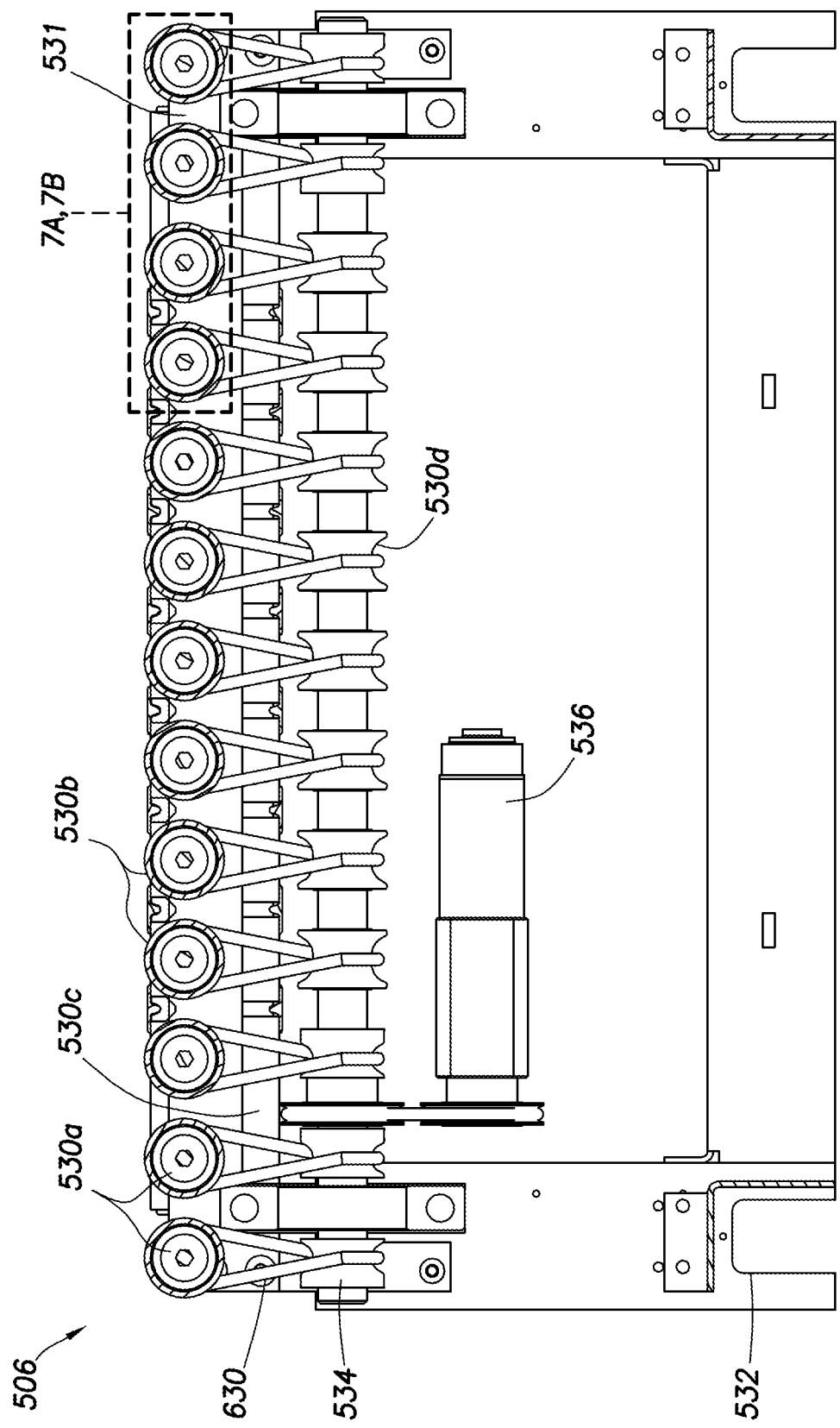

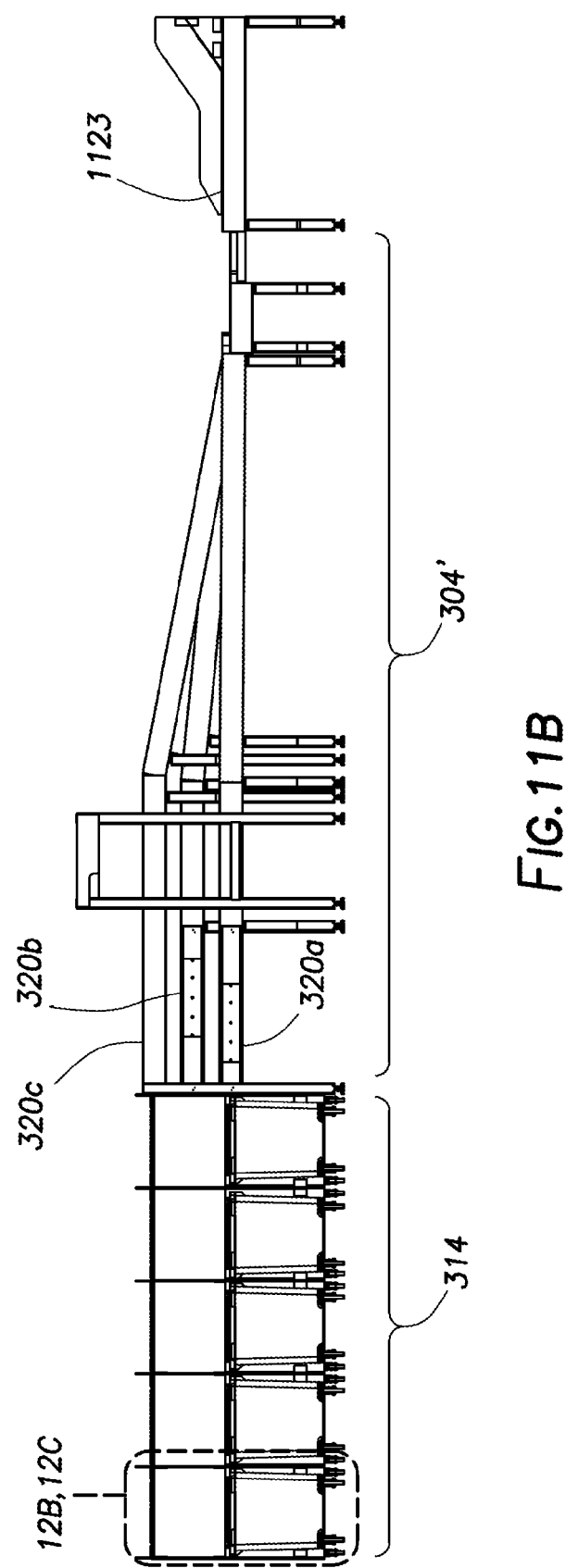

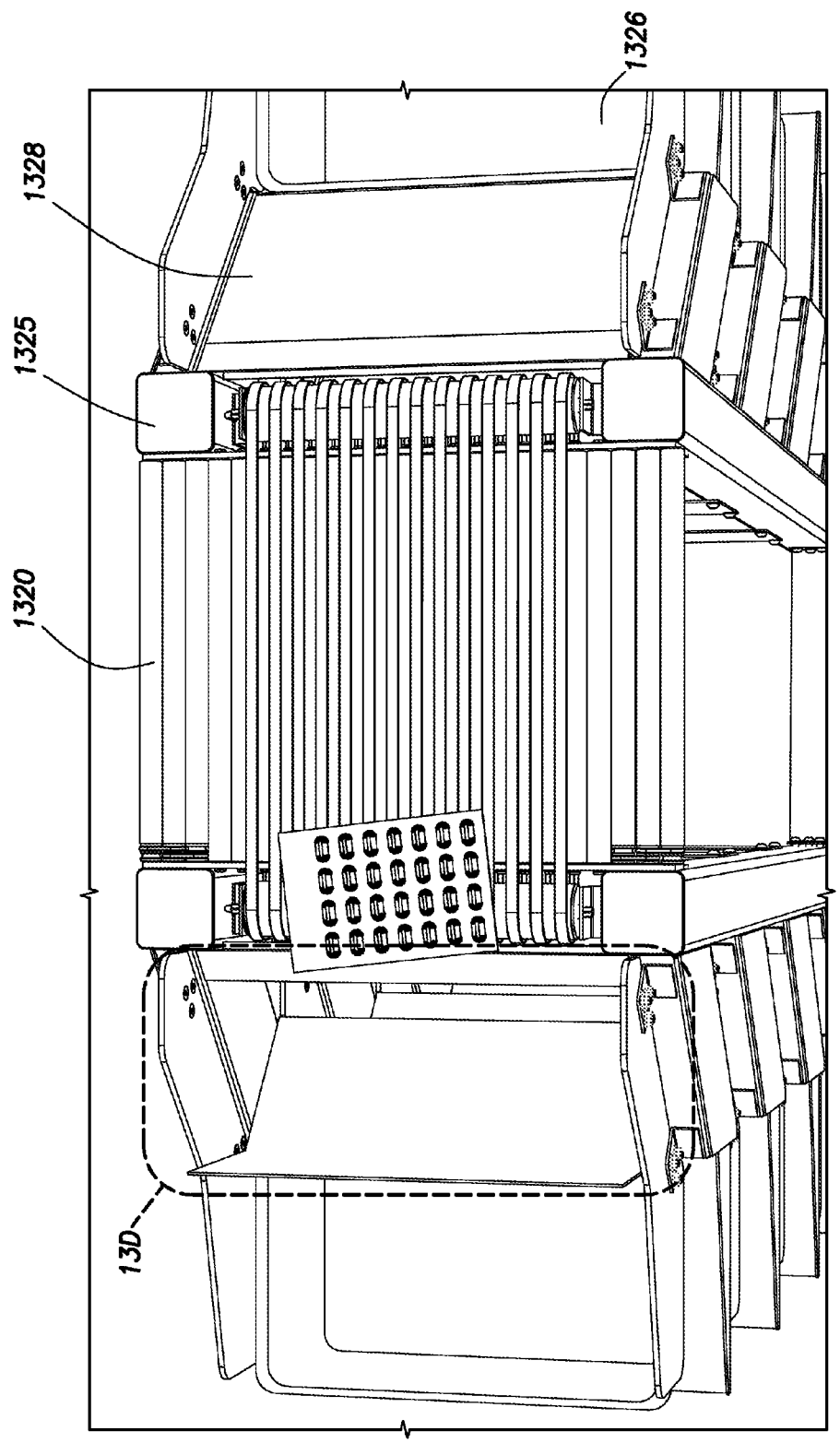

MODULAR HANDLING SYSTEM WITH MULTI-LEVEL SORTER AND METHOD OF USING SAME

CROSS-REFERENCE TO RELATED APPLICATIONS

This application claims the benefit of U.S. Provisional Application No. 62/210,310, filed Aug. 26, 2015, and U.S. Provisional Application No. 62/210,348, filed Aug. 26, 2015, the entire contents of which is hereby incorporated by reference.

BACKGROUND

The present disclosure relates generally to handling equipment. More specifically, the present disclosure relates to conveyors, sorters, and/or related equipment used in handling materials.

Conveyors include mechanical structures extending from one location to another to move materials between such locations. For example, manufacturing industries may use conveyors to pass product components between workstations at the locations to enable assembly of the product components into a finished product. Such conveyors are fixed in place (e.g., bolted to the floor) in a manufacturing facility, and include frames with rollers or belts that enable the product components to pass along the frame to the workstations. Such conveyors may also be provided with replaceable rollers or belts that may wear out over time.

The fixed conveyors may extend between multiple locations in the facility. Sorting devices may be provided to divert the materials along the conveyors to certain locations in the facility. For example, facilities with large distribution centers, such as retail stores, may have automated sorting equipment coupled to the fixed conveyors to sort and divert cases along various portions of the conveyors to locations in the facility. The facilities may also employ forklifts and carts to transport the materials to or from the conveyors.

Despite advances in conveyor technology, a need for more efficient means for conveying, transferring, and sorting materials remains. The present disclosure seeks to fill such needs.

SUMMARY

In at least one aspect, the disclosure relates to multi-level sorter of a handling system for transporting cases. The handling system has conveyors extending between locations of a facility. The multi-level sorter comprises a multi-level frame positionable adjacent at least one outlet of at least one of the conveyors, at least one diverter carried by the multi-level frame, at least one bin supported about at least one of the levels of the multi-level frame.

Each of the outlets of the conveyors is aligned with a level of the multi-level frame to pass the cases thereto. The at least one diverter has rollers to pass the cases along a main path and crossbands to selectively divert the cases from the main path. Each of the bins is alignable with the diverter to receive the diverted cases therefrom whereby the cases are sorted.

In another aspect, the disclosure relates to a handling system for transporting cases about a facility. The handling system comprises a conveyor unit comprising at least one conveyor extending between locations of the facility and a multi-level sorter. The conveyor has at least one inlet and at least one outlet. The multi-level sorter comprises a multi-level frame positionable adjacent at least one outlet of at least one of the conveyors, at least one diverter carried by the multi-level frame, at least one bin supported about at least one of the levels of the multi-level frame.

Each of the outlets of the conveyors is aligned with a level of the multi-level frame to pass the cases thereto. The at least one diverter has rollers to pass the cases along a main path and crossbands to selectively divert the cases from the main path. Each of the bins is alignable with the diverter to receive the diverted cases therefrom whereby the cases are sorted.

In yet another aspect, the disclosure relates to a crossband of a diverter of a conveyor. The diverter comprises conveyor rollers alignable with the conveyor and drive rollers. A top of the conveyor rollers defines a conveyor surface for passing cases therealong. The crossband comprises a continuous loop positionable between the conveyor rollers. The loop has an inner surface rotatably positionable about the drive rollers and an outer surface shaped to drivingly engage the cases. The loop comprises a base portion having a thickness and at least one cam portion having an increased thickness. The outer surface along the base portion is positioned below the conveyor surface. The outer surface along the cam portion extends a distance above the conveyor surface. The cam portion has an incline at a contact end thereof engagable with a bottom of the cases to lift and push the cases as the continuous loop advances about the drive rollers whereby the cases are selectively diverted from the conveyor.

Finally, in another aspect, the disclosure relates to a diverter of a handling system for transporting cases about a facility. The handling system has at least one conveyor. The diverter comprises a frame positionable adjacent a conveyor, conveyor rollers rotationally supported by the frame and alignable with the conveyor (a top of the conveyor rollers defining a conveyor surface, drive rollers rotationally supported by the frame, and crossbands positionable between the conveyor rollers. The crossbands rotatable in a direction transverse to the conveyor rollers. The crossband comprises a continuous loop positionable between the conveyor rollers. The loop has an inner surface rotatably positionable about the drive rollers and an outer surface shaped to drivingly engage the cases. The loop comprises a base portion having a thickness and at least one cam portion having an increased thickness. The outer surface along the base portion is positioned below the conveyor surface. The outer surface along the cam portion extends a distance above the conveyor surface. The cam portion has an incline at a contact end thereof engagable with a bottom of the cases to lift and push the cases as the continuous loop advances about the drive rollers whereby the cases are selectively diverted from the conveyor.

BRIEF DESCRIPTION OF THE DRAWINGS

So that the above recited features and advantages of the present disclosure can be understood in detail, a more particular description of the invention, briefly summarized above, may be had by reference to the embodiments thereof that are illustrated in the appended drawings. The appended drawings illustrate example embodiments and are, therefore, not to be considered limiting of its scope. The figures are not necessarily to scale and certain features, and certain views of the figures may be shown exaggerated in scale or in schematic in the interest of clarity and conciseness.

FIGS. 5A-5H show various views of example diverters.

FIG. 6 is a side view showing details of another example diverter.

FIGS. 11A-11D are schematic views of another handling system with another conveyor unit and the multi-level sorter.

FIGS. 13A-13D are schematic views of s configurations of another multi-level sorter in a stacked bin configuration.

DETAILED DESCRIPTION OF THE INVENTION

Figure 1A:
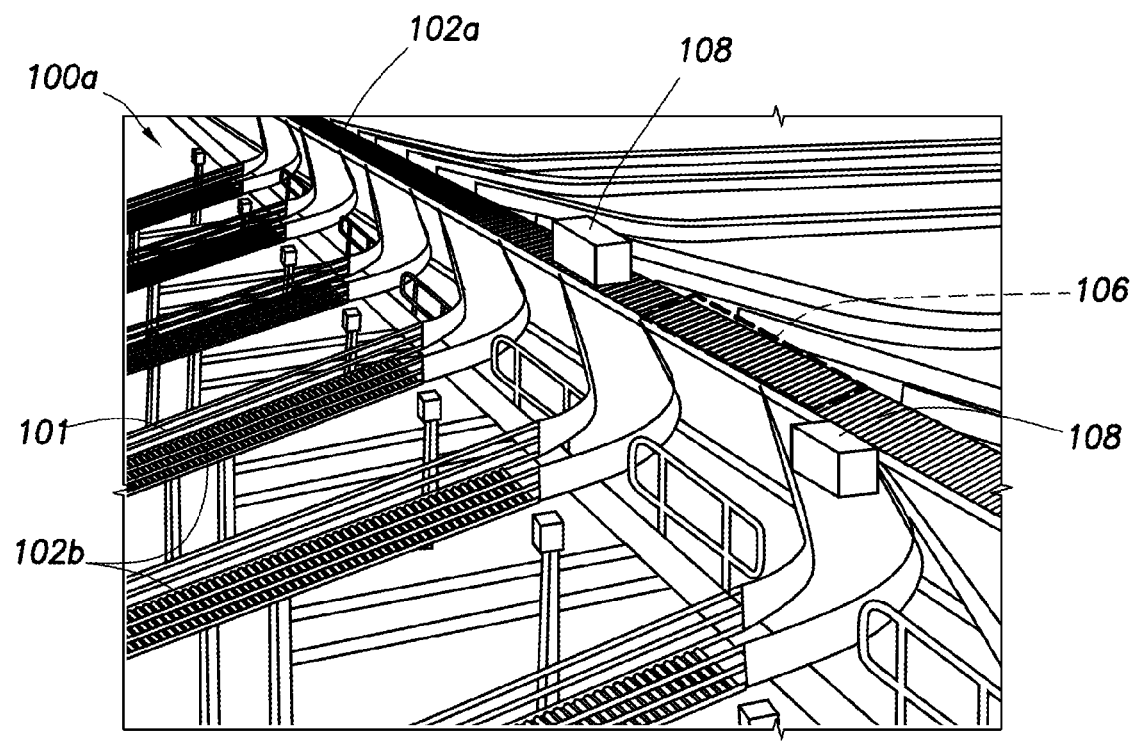
FIGS. 1A and 1B show example facilities with handling systems.

The description that follows includes exemplary apparatus, methods, techniques, and/or instruction sequences that embody techniques of the present subject matter. However, it is understood that the described embodiments may be practiced without these specific details.

A modular handling (or conveyor) system is provided to transport cases (e.g., materials, packages, cartons, bags, and/or other discrete items) between locations in a facility. The handling system includes one or more conveyors, diverters, conveyor units, sorting units, and/or multi-level sorters. The conveyor units may include modular sections of conveyors and/or diverters to pass cases from one location to another. The multi-level sorters may include modular sections of conveyors, diverters, and/or bins in a multi-level configuration to sort cases received from the conveyor units. The handling system may be capable of handling both regular and irregular cases (described further herein).

The diverters may be provided at various locations along the conveyor unit and/or multi-level sorter to divert the cases from one location or another. The diverters may be in a multi-level configuration to allow multiple vertical and/or horizontal levels of transfers to different bins. Mechanisms, such as ramped conveyor belts, may be provided to facilitate diversion of cases. Sorting units may be provided to activate the diverters to selectively divert cases to different portions of the conveyor unit and/or multi-level sorter.

The multi-level sorters may also be provided at various locations along the conveyors and/or conveyor units to capture the cases. The multi-level sorters may include bins, separators, platforms, ramps, diverters, conveyors, and/or other features to facilitate sorting (e.g., separating, capturing, binning, offloading, staging, etc.) at individual locations about the conveyor. The multi-level sorters may be stacked and/or staggered about the conveyors for sorting, capturing, and/or storing the cases.

The handling system may also have an equipment design intended to enhance inventory and/or flow. For example, the handling system may be used to provide for receiving and sorting automation, and/or to enable distributed logistics in a variety of facilities (e.g., stores). Such automation may also be intended to increase product flow at the facilities such that, in effect, automation may create cost savings by improving backroom and store stocking efficiency, and/or by moving operations from a regional distribution center (RDC) to the facilities where automation may be performed more efficiently with added value.

The handling system may be configured to provide rates superior to narrow belt sorters and may handle items packed in difficult to handle packaging, such as regular and/or irregular cases. The modular handling system may seek to provide increased speeds as compared with other designs of right angle transfers, combined with the ability to be easily moved, configured, and/or stacked to provide unprecedented transfer rates. The modular handling system may also seek to provide compact systems with high sortation rates for irregular items in difficult to convey packaging.

Facility

Figure 1B:
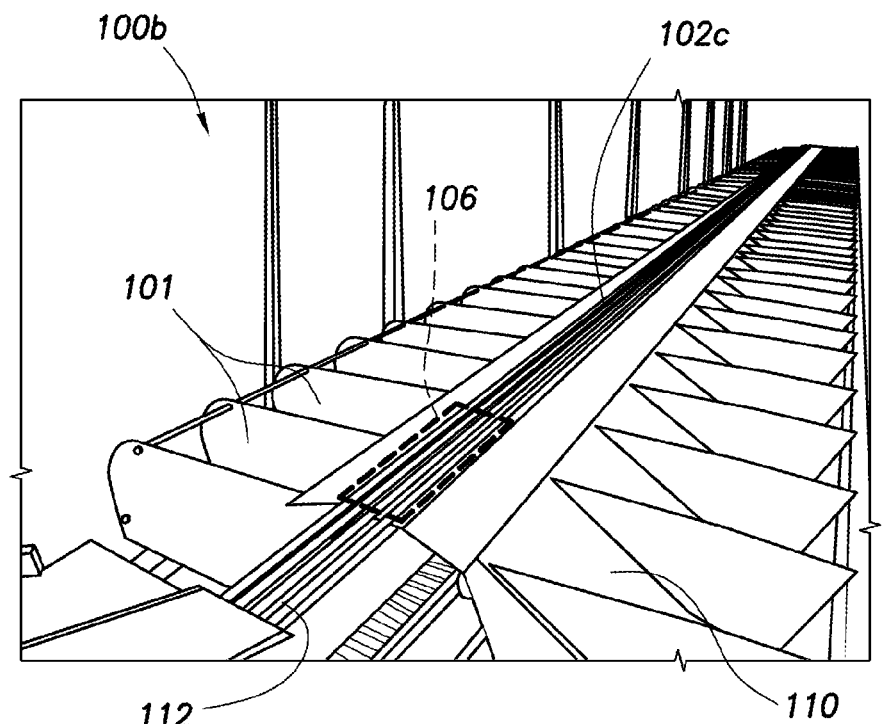

Facilities may be provided with conveyors which extend across portions of the facility as shown in the example handling systems 100a,b of FIGS. 1A and 1B, respectively. While a specific example is depicted in these figures, various configurations of conveyors and/or related equipment may be provided. These facilities may require weight, identification, and/or other devices for operation. Examples of handling systems and/or related equipment are provided in US Patent Application No. WO 2014/165288, WO 2014/165281, US 2015/0144536, 62/053,009, 62/210,348, U.S. Pat. No. 5,984,078, and 62/210,310, the entire contents of which are hereby incorporated by reference herein, the entire contents of which are hereby incorporated by reference herein.

FIG. 1A depicts an example handling system 100a including a main conveyor 102a with high velocity sliding shoe sorters 102b extending from the conveyor 102a. As schematically shown by the dashed box, a diverter 106 may be provided on the handling system 100a to divert cases 108 to different portions of the conveyor 102a, such as to one of the sorters 102b. Examples of diverters that may be used are described further herein. As schematically shown, each sorter 102b may be provided with bins 101 at a receiving end thereof to capture the cases 108.

FIG. 1B depicts another example handling system 100b including a main conveyor 102c. As shown in this version, the conveyor 102c may be provided with multiple bins 101 connected thereto to capture cases 108 from the conveyor 102c. As shown in the example of FIG. 1B, the bins 101 extend linearly along each side of the conveyor 102c to receive cases 108 released therefrom. In the example handling system of FIG. 1B, the main conveyor 102c has pop-up rollers 112 to push items from the conveyor 102c into the receptacles 110 of the bins 101 adjacent to the conveyor 102c. As schematically shown by the dashed box, the conveyor 102c may be provided with a diverter 106 in place of the pop-up rollers 112 to divert the cases 108 into the bins 101. The bins 101 may be in the form of multi-level sorters described further herein.

Figure 2A:
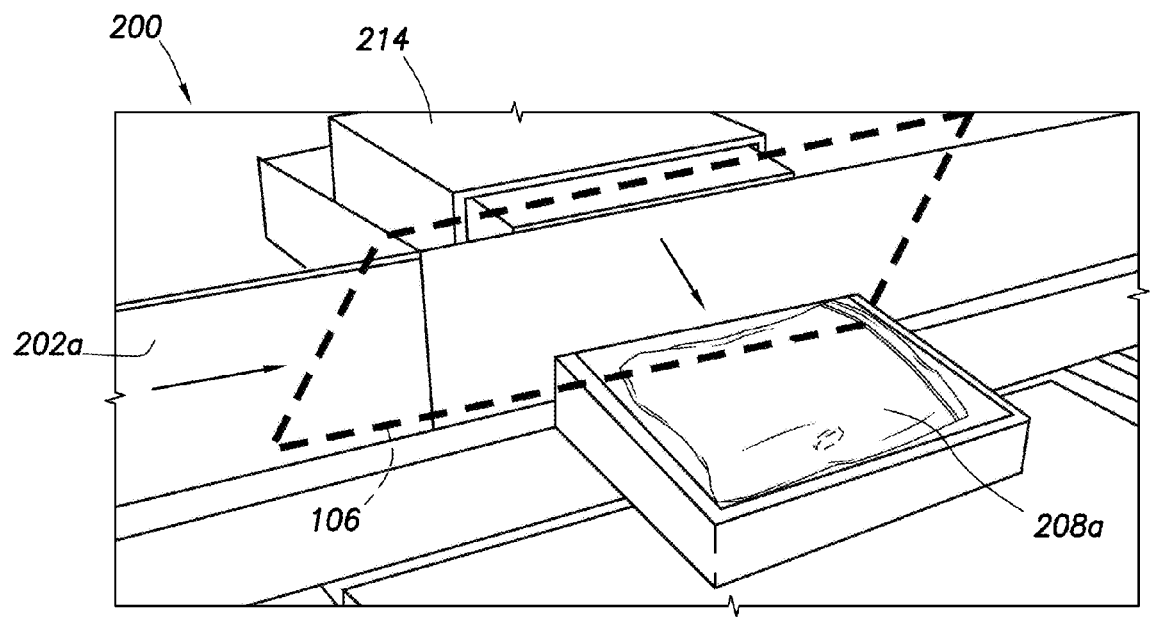
FIGS. 2A and 2B show example cases used with handling systems.
Figure 2B:
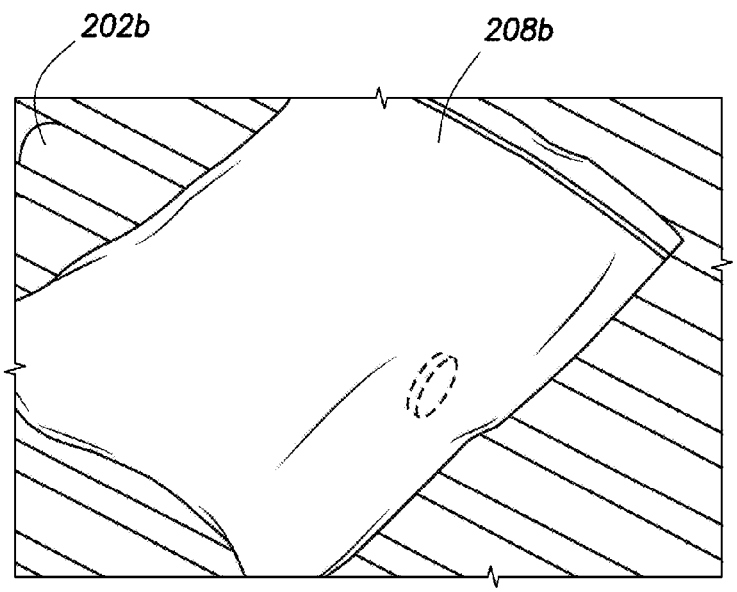

FIGS. 2A and 2B show example cases 208a,b that may be transferred by a handling system 200. FIG. 2A shows an example case 208a in the form of a regular case, such as a box having a polygonal cuboid shape and a rigid structure. FIG. 2A also shows an example handling system 200 with a belt conveyor 202a and a transfer device 214 used to transfer the case 208a from the conveyor 202a to another location.

This example shows the transfer device 214 as a 'pusher' style transfer for pushing the case 208a off of the belt conveyor 202a. While the transfer device 214 is depicted as a 'pusher,' as schematically shown by the dashed box 104, a diverter 104 may be provided along the belt conveyor 202a of the handling system 200 to divert the case 208a away from the path of the conveyor 202a. For example, the case 208a may be driven from the main flow conveyor 202a to one side or the other, such as laterally away from a main path of the conveyor 202a, as shown by the arrows.

Various transfer devices, such as right angle transfers, pop-up diverters, narrow belt sorters, lever arms, sliding shoes, straight line pushers (from the side), overhead paddles, and/or other devices, may be positioned along portions of the handling system, such as the conveyor 202a to move items, such as the case 208a, from the conveyor 202a to other locations. While a right angle transfer is shown, various angles of departure with respect to the main flow are available depending, for example, on the case, velocities, etc. An example diverter usable as the transfer device is described further herein.

FIG. 2B shows an example 'irregular' case 208b that may be used. In the example of FIG. 2B, the irregular case 208b is passed along a roller conveyor 202b. This irregular case 208b is depicted in FIG. 2B as a plastic bag containing an item. While a specific example of an irregular case 208b is shown, the irregular cases may be in the form of polybags, blister packs, bubble packs, corrugate boxes, envelopes, paper wrap, shrink wrap, flexible trays, and/or other non-rigid items (with or without packaging). Such irregular cases may be flexible, flimsy, lightweight, and/or change shape (or have an unusual (non-box) shape), and may require a handling system capable of handling such a structure. For example, some cases have uneven surfaces that catch between members (e.g., belts or rollers) of the moving parts of the handling system, such as conveyor rollers.

FIGS. 3A-3D show various views of an example modular handling system 300 capable of conveying, transferring, and sorting regular and/or irregular packaged items (e.g., cases). The handling system 300 includes a multi-level conveyor unit 304 and a multi-level sorter 314. In this example, the multi-level conveyor unit 304 includes three conveyors 320a-c, each at a different vertical conveyor levels. The conveyors 320a-c each define a stacked conveyor path at a base, intermediate, and upper level, respectively, extending between inlet(s) 322a and outlet(s) 322b leading to portions of the multi-level sorter 314. The inlets 322a may be provided with loaders 323 including conveyor ramps and/or bins (receptacles) as shown.

The conveyor 320a is shown at a base level, with load conveyors 320b,c extending to the intermediate and upper levels above the base level. The example shows that the conveyors 320a-c may extend from opposite sides of the multi-level sorter 304 for dual loading capabilities. Diverters 106 are shown at ends of the load conveyors 320a-c to feed packages from the base level to the upper levels. An additional load conveyor 320d is also shown as feeding into another location along the base level. One or more diverters, conveyor portions, and/or other features may be provided along the conveyor unit 304. The conveyor unit 304 may be provided with various configurations and/or features to facilitate distribution of the cases as is described further herein.

In the example shown, the inlets 322a feed the cases onto the conveyor unit 304 which are diverted by diverters 106 to the different load conveyors 320a-c for distribution to different conveyor levels of the multi-level sorter 314. The multi-level sorter 314 is shown as having three bin conveyors 324a-c at three vertical bin levels corresponding to the outlets 322b of each of the three conveyor levels 320a-c. Cases are fed onto the bin conveyors 324a-c from the load conveyors 320a-c at corresponding conveyor/bin levels.

The multi-level sorter 314 also has diverters 106 along the bin conveyors 324a-c for diverting cases from the bin levels 320a-c to bins 326 at various locations along each of the bin conveyors 324a-c. Ramps 325 are provided from the upper bin levels 324a-c to the bins 326. As shown, the diverters 106 are positioned adjacent each of the bins 326 at horizontal positions along the bin conveyors 324a-c to divert the cases thereto. The diverters 106 on each level are aligned with one or more of the bins 326 at the horizontal positions, thereby providing three diverters 106 feeding each bin 326 along the multi-level sorter 314, thereby providing multi-feed capabilities for each bin 326. The multi-level sorter 314 may be provided with features to facilitate sorting and/or capture of the cases as is described further herein.

The handling system 300 may be in various configurations with various modular features connectable to perform the desired function(s). For example, the handling system 300 may have a main conveyor path that extends between each location (e.g., between an inlet 322a and an outlet 322b), and various paths extending therefrom. As schematically shown by the dashed boxes, the diverters 106 may be provided on the handling system 300 to divert cases about the conveyor unit 304 and/or the multi-level sorter 314. The diverters 106 may be positioned along the load and/or bin conveyors to divert and/or to provide direction changes to various paths. Bins 326 may be provided at various locations along the conveyors and/or paths to load and/or capture the cases.

Figure 4A:
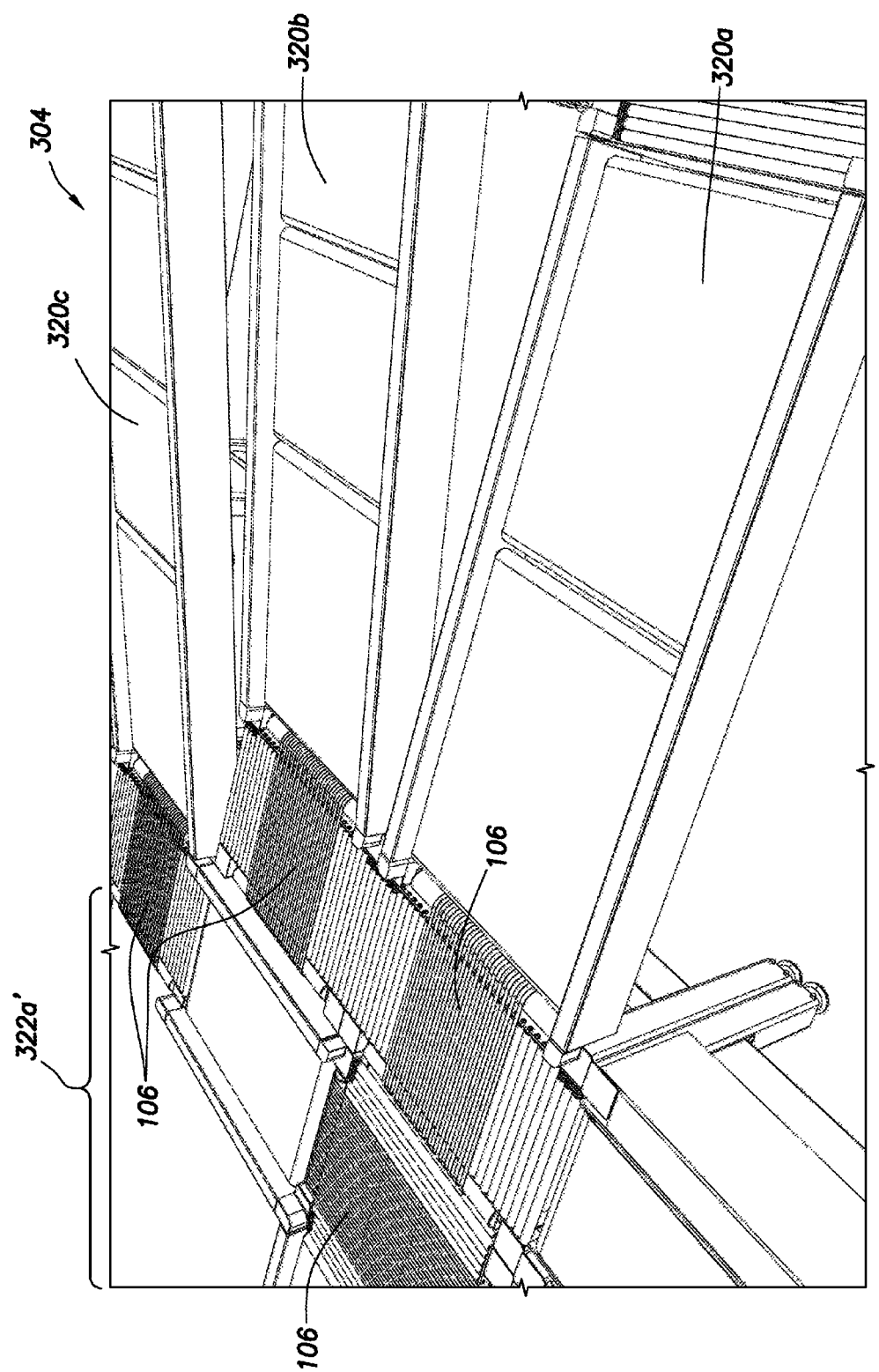
FIGS. 4A-4D shows example portions of the conveyor units and the multi-level sorters.
Figure 4B:
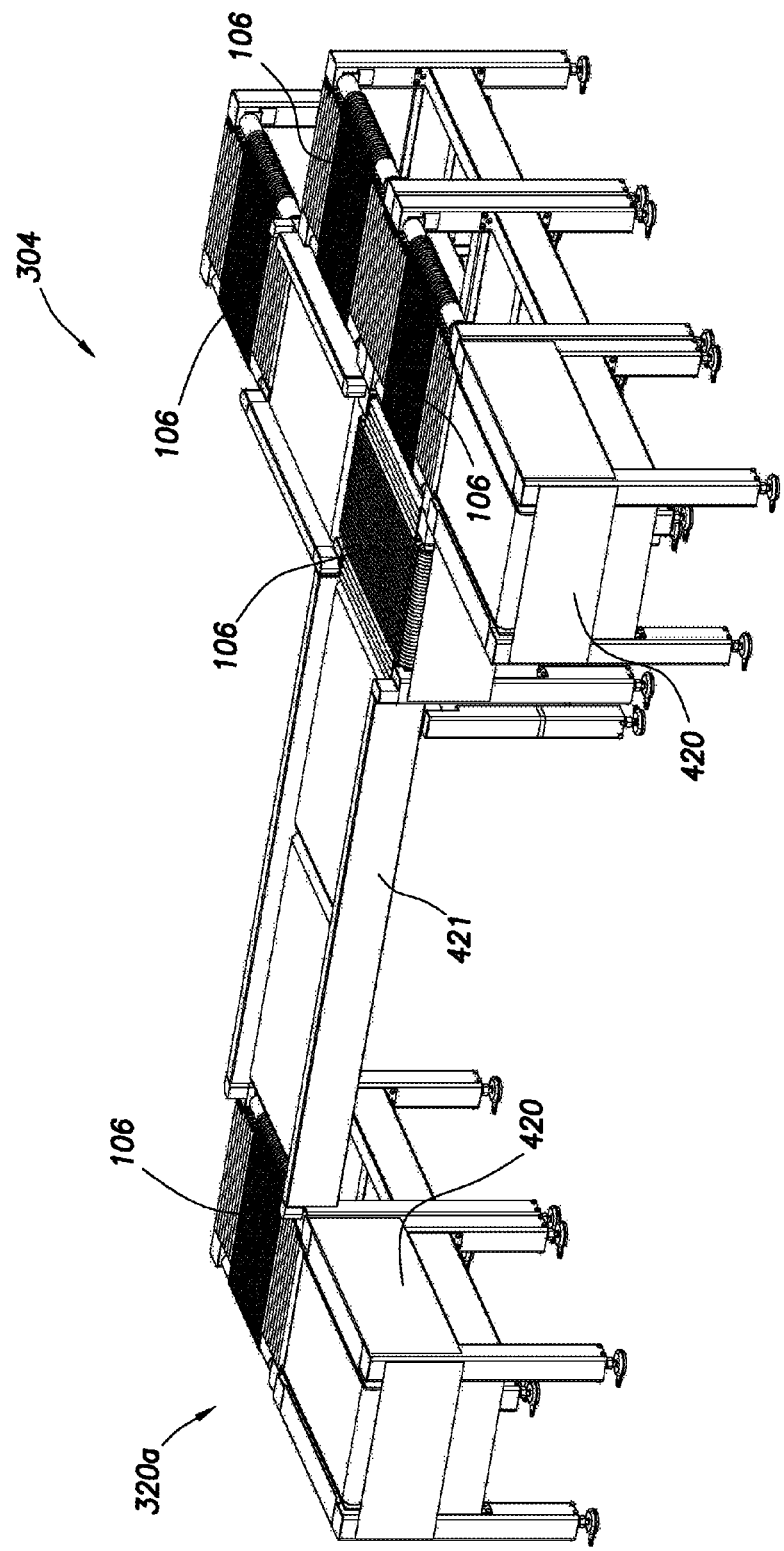

FIGS. 4A-4D show example features of the conveyor unit 304 and multi-level sorter 314 in greater detail. As shown in the version of FIGS. 4A and 4B, the conveyor unit 304 may be provided with various conveyors 320a-c and/or diverters 106 to form various combinations of the conveyor unit 304 of the handling system 300. Portions of the conveyor unit 304 may be combined to define conveyor modules that may be connected to form various configurations capable of passing the cases to desired locations. As shown in the example of FIG. 4A, one or more of the diverters 106 may be positioned adjacent conveyors 320a-b to transfer the cases from a base level to upper levels at an angle (e.g., 90, 60 or 30 degrees) in relation to the base conveyor 320a. In this example, the base conveyor 320a has multiple conveyor portions with diverters 106 therebetween that form the inlet 322a' to feed cases to the upper conveyor levels 320b-c.

FIG. 4B shows another configuration of the conveyor unit 304. In this version, the diverters 106 are connected to portions of the base conveyor 320a to form the inlet 322a'. As shown by FIGS. 4A and 4B, various combinations of diverters 106 and conveyors 320a-c may be combined to provide inlets and outlets extending between locations to transfer the cases to desired locations. Each of the portions of the conveyor 320a may be mobile and connectable to one or more of the diverters 106 to provide the desired configuration. As shown, the base conveyor 320a may include modular conveyor components 420, diverters 106, and conveyor panels 421. This may allow the conveyor unit 304 to have a modular configuration capable of transporting packages from multiple locations at various levels to a common multi-level sorter.

Figure 3A:
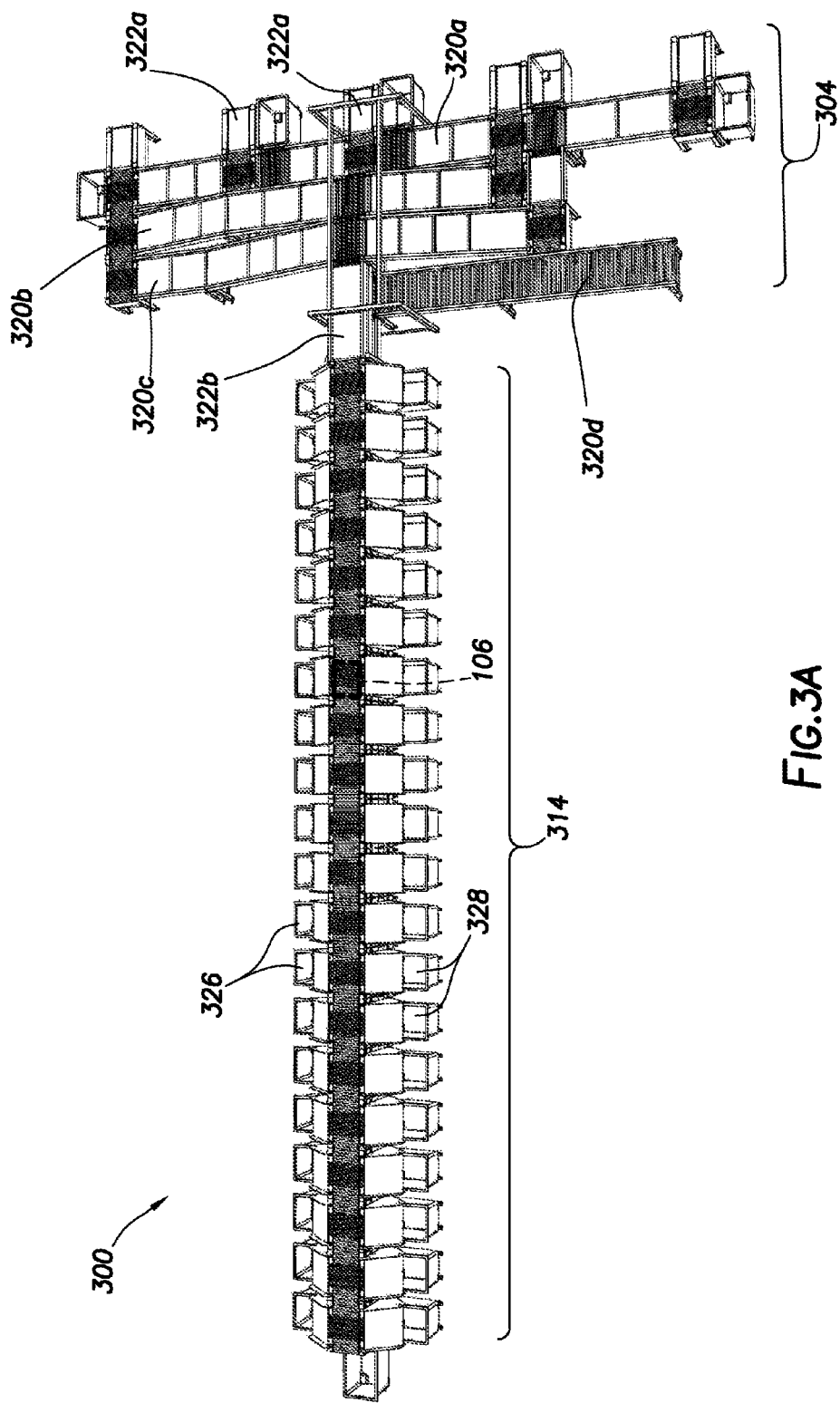
FIGS. 3A-3D show example handling systems with a conveyor unit and a multi-level sorter.
Figure 3B:
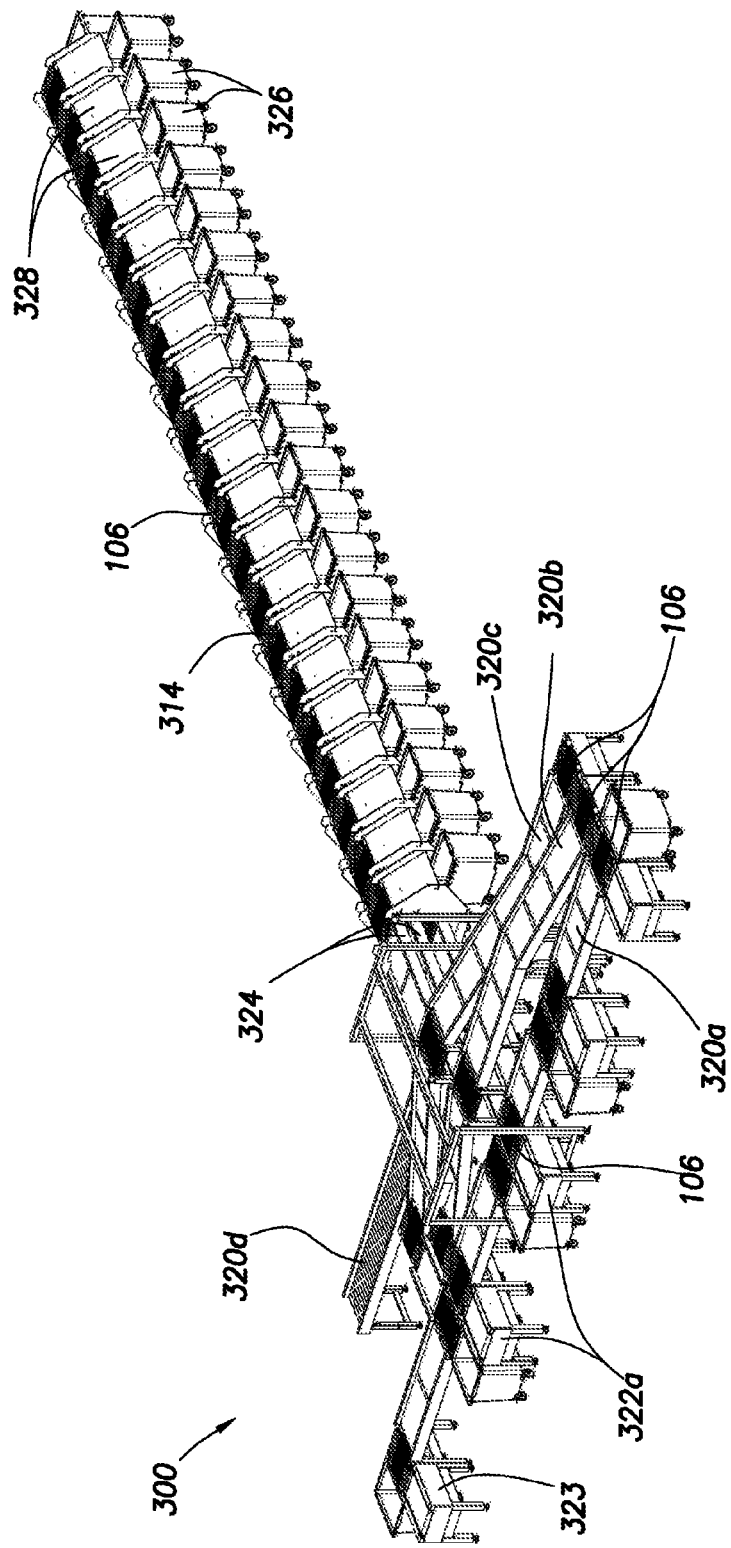
Figure 3C:
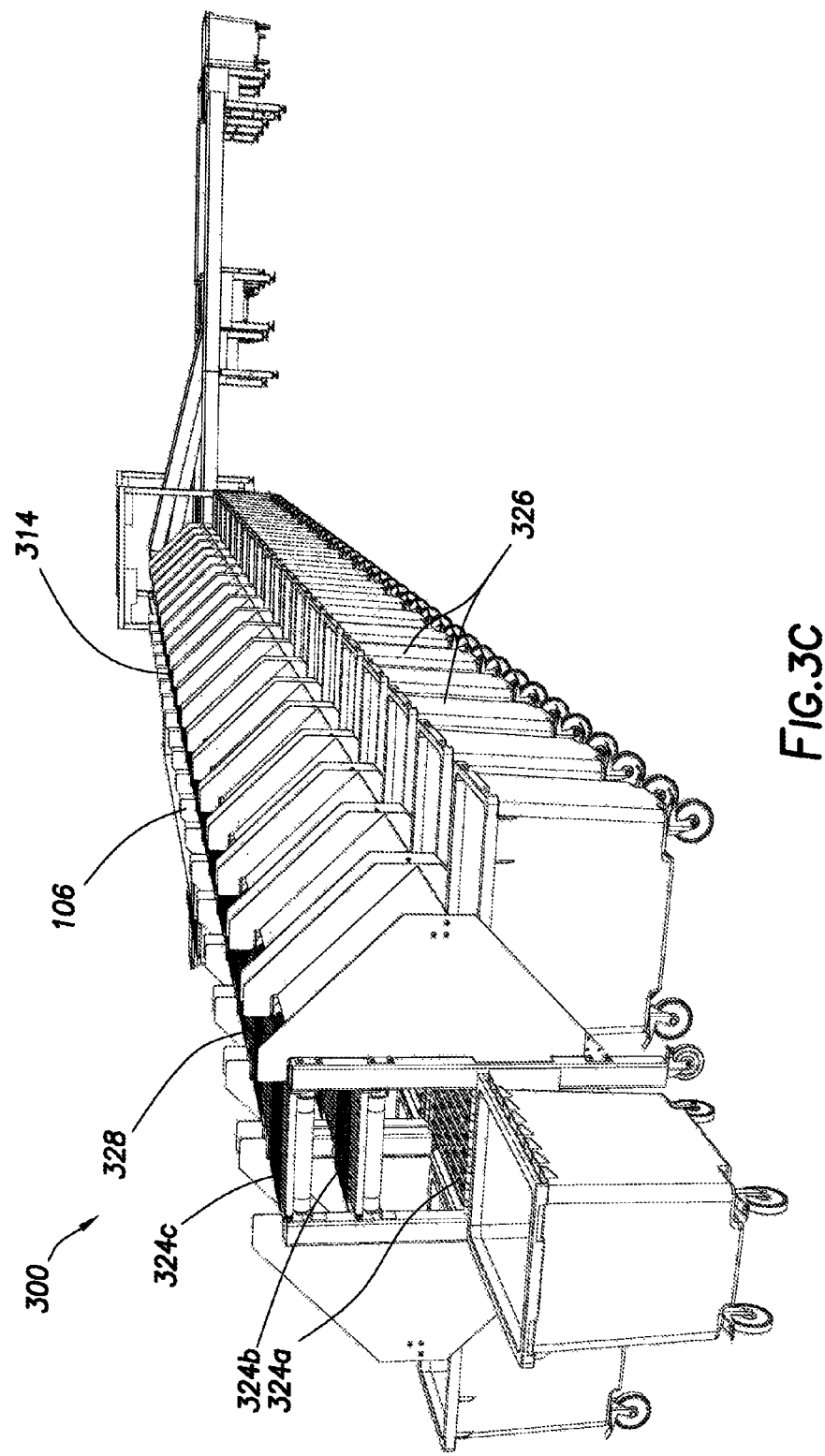
Figure 3D:
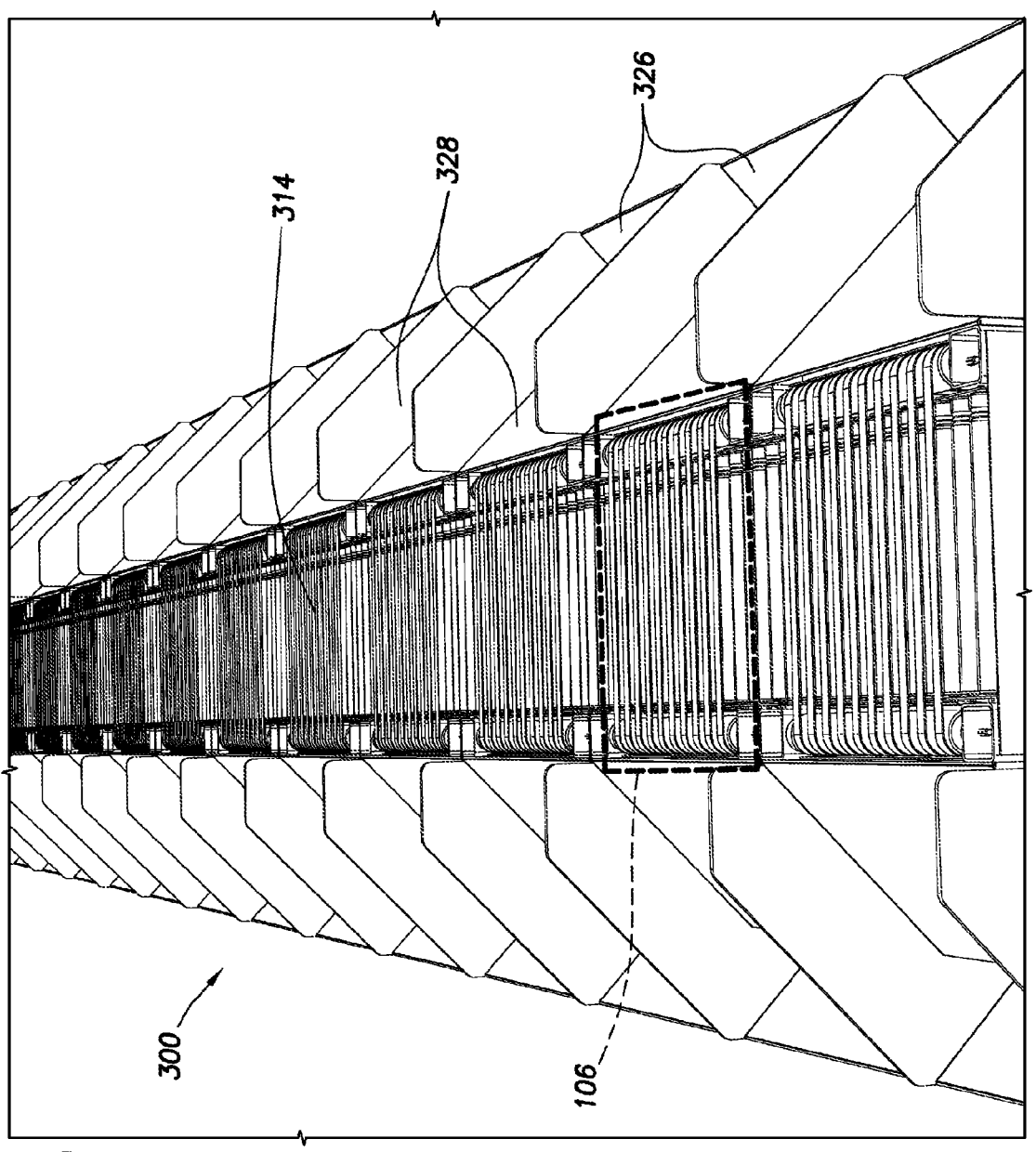
Figure 4C:
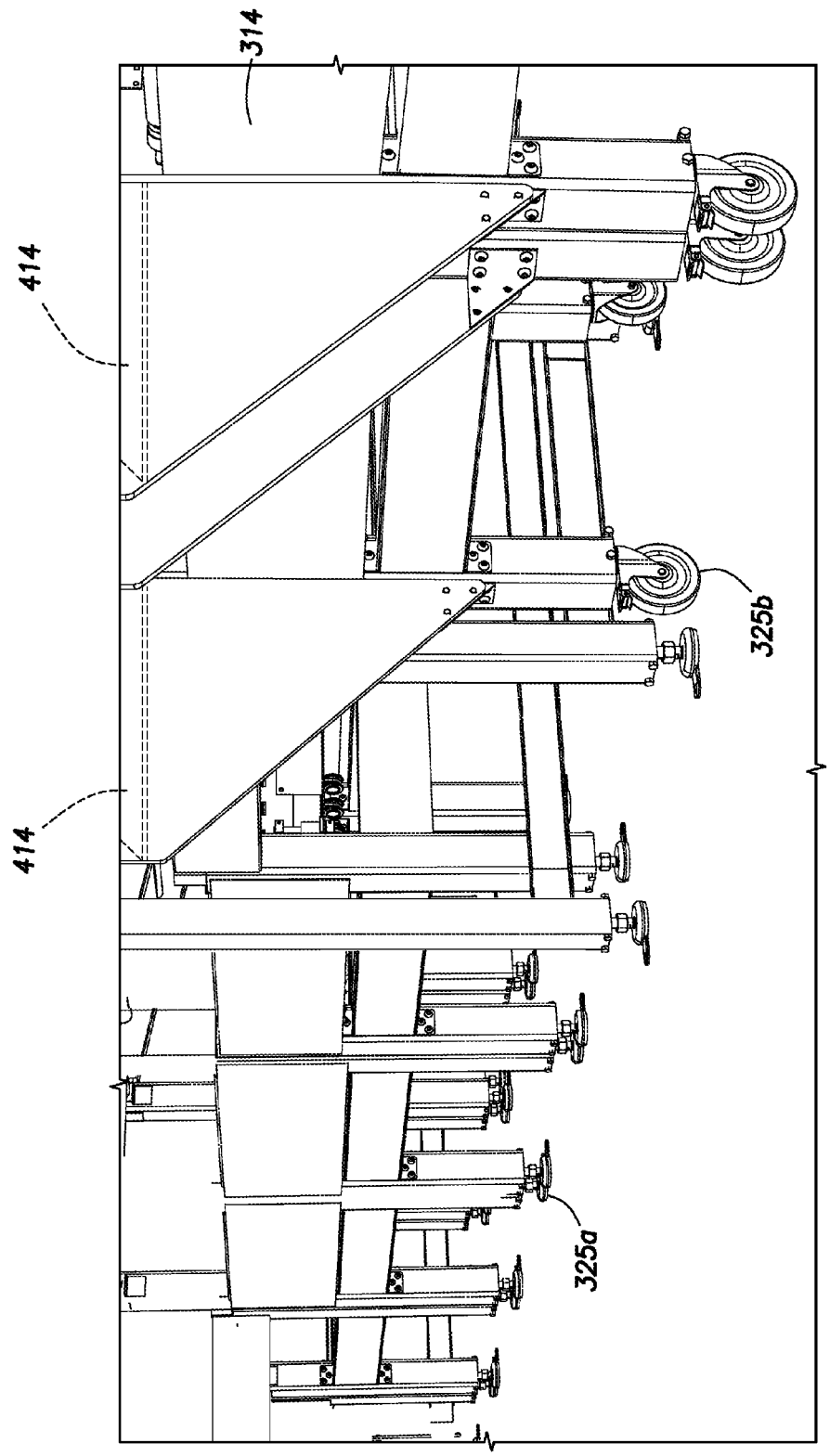
Figure 4D:
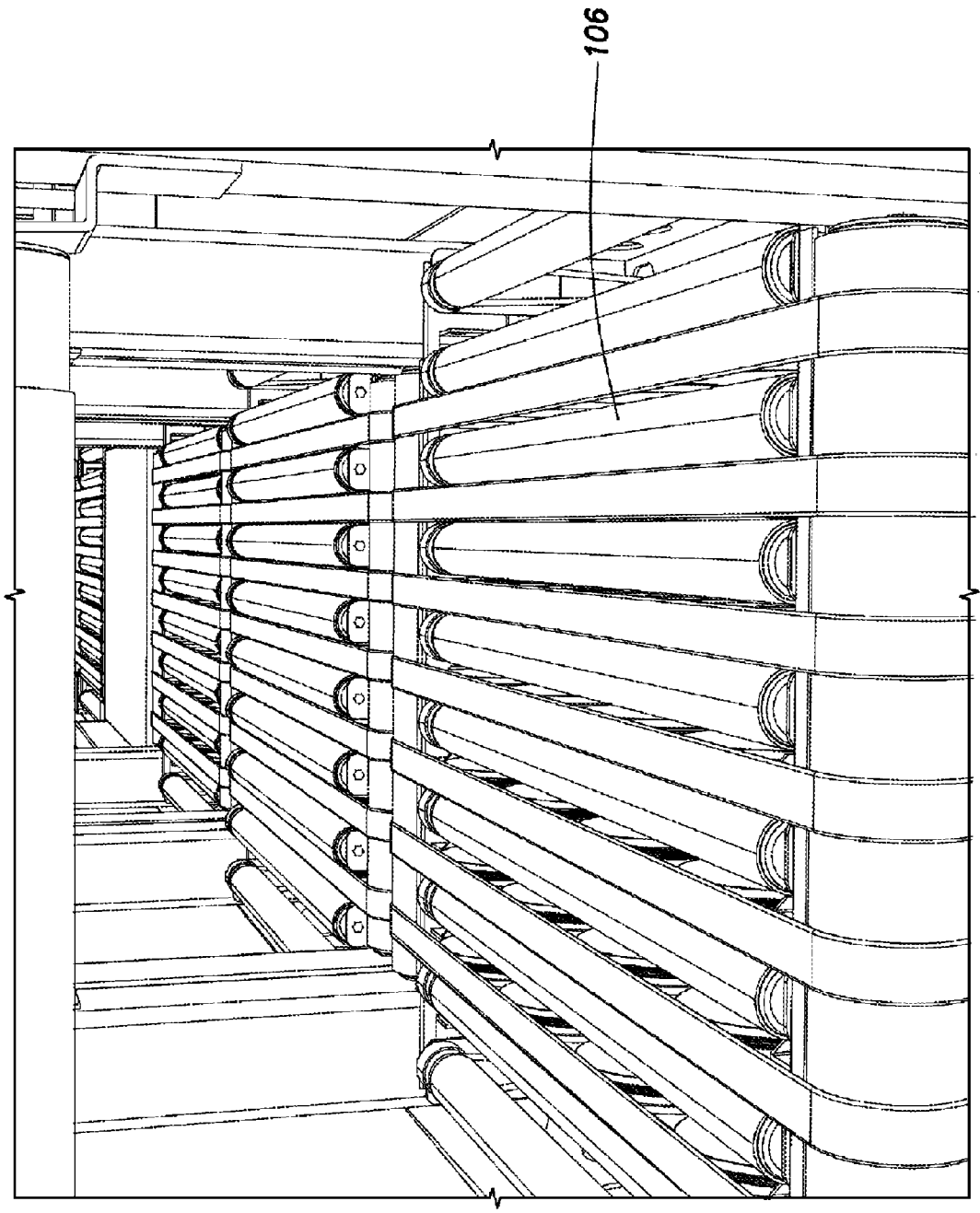

FIGS. 4C and 4D show portions of the multi-level sorter 314. FIG. 4C shows portions of the multi-level sorter 314 including modular bin modules 414 positioned in series to define the bin conveyors 324a-c (FIGS. 3A-3D). As shown in FIG. 4C, the bin modules 414 may be provided various feet and/or rollers 325a,b for adjustability and/or mobility. Similar features may be provided for the modules of the conveyor unit 304.

FIG. 4D shows a portion of the multi-level sorter 314 depicting rollers and crossbands of the diverters 106 of one of the bin conveyors. As shown by this view, part or all of the bin conveyors 324a-c may be formed of the diverters 106 to divert packages from the bin conveyors 324a-c to the bins 326. These figures also show that the multi-level sorter 314 may be arranged in various configurations of varying length and number of sorts determined by the number of bin modules 414 combined. The diverters 106 in the bin modules 414 may be aligned together to form a continuous conveyor without gaps or transitions to affect flow of irregular and/or difficult cases. Multiple diverters and/or conveyor modules may be aligned as part of the conveyor and/or multi-level sorter with or without perceivable gaps between modules. Diverters can be located side by side to effect direction changes (e.g., a compact 180 direction change) for items conveyed.

The modular configuration may be used to provide transport, sorting, capture, and/or storage of cases as needed. The vertical sort and delivery capabilities may be defined to provide a reduced footprint, thereby reducing floor space while providing multiple sort and delivery capabilities to increase flow velocities.

Interlaced Diverter

FIGS. 5A-5H and 6 show various views of a diverter unit (or transfer device) 528. The diverter unit 528 may be a modular component that may be used as a transfer device along a conveyer unit 304 and/or multi-level sorter 314 (see, e.g., FIGS. 3A-4D). The diverter unit 528 may be a modular unit forming a single zone or section of a main conveyor with crossbands to divert the cases away from the main conveyor path. While a single diverter unit 528 with three levels each with a single diverter 506 is depicted, the diverter unit 528 may have one or more levels with one or more diverters and/or conveyors on each level.

Such a diverter 506 may or may not incorporate features of existing transfer mechanisms, such as mechanisms for lifting or pushing. In these example figures, the diverter 506 is shown as including the frame 532 with the rollers 530a,d and crossbands 530b forming a diverter unit (or sorter module). The frame 532 and rollers 530a may define a conveyor portion with crossbands 530b positioned across the conveyor portion.

Figure 5A:
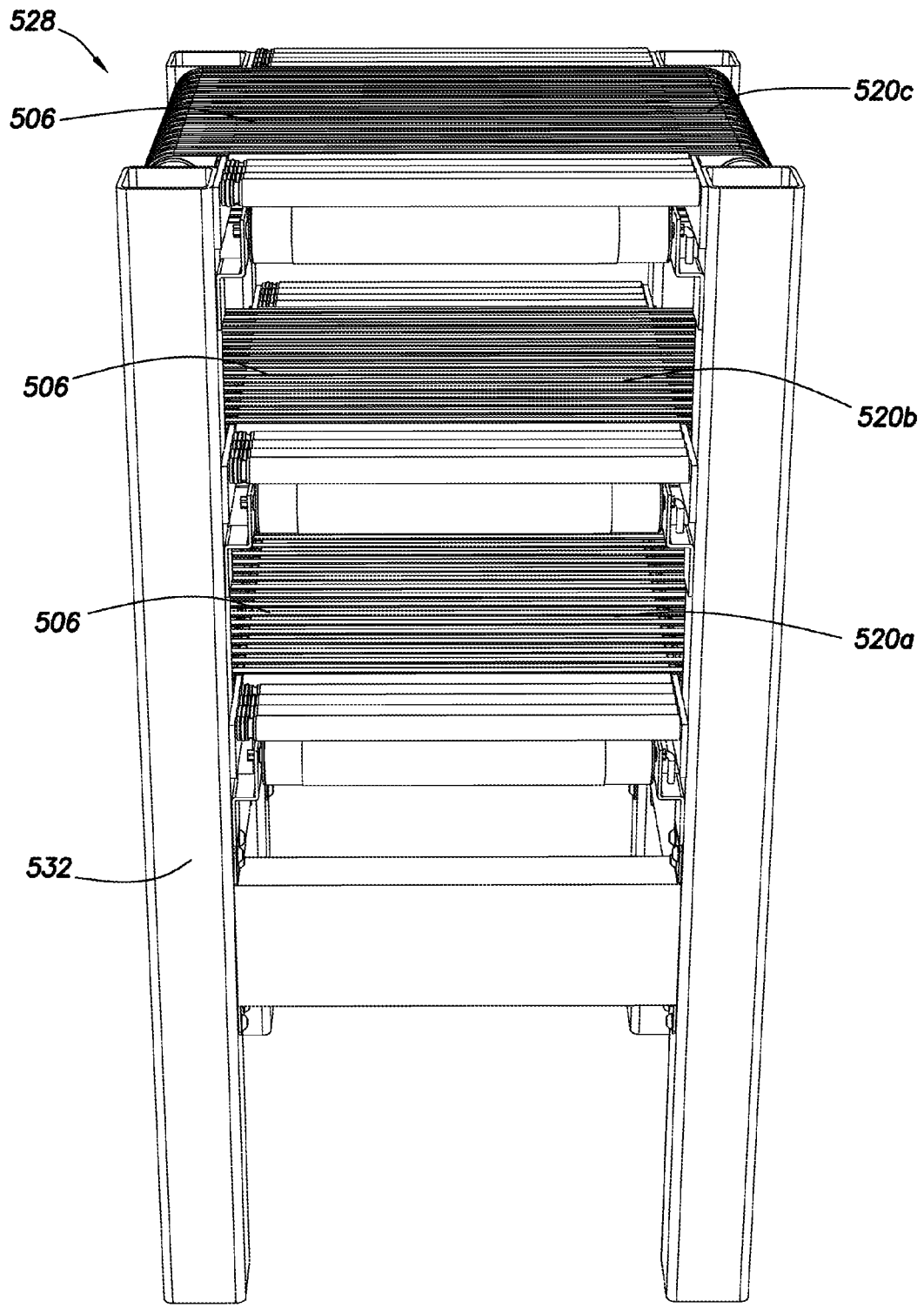
Figure 5B:
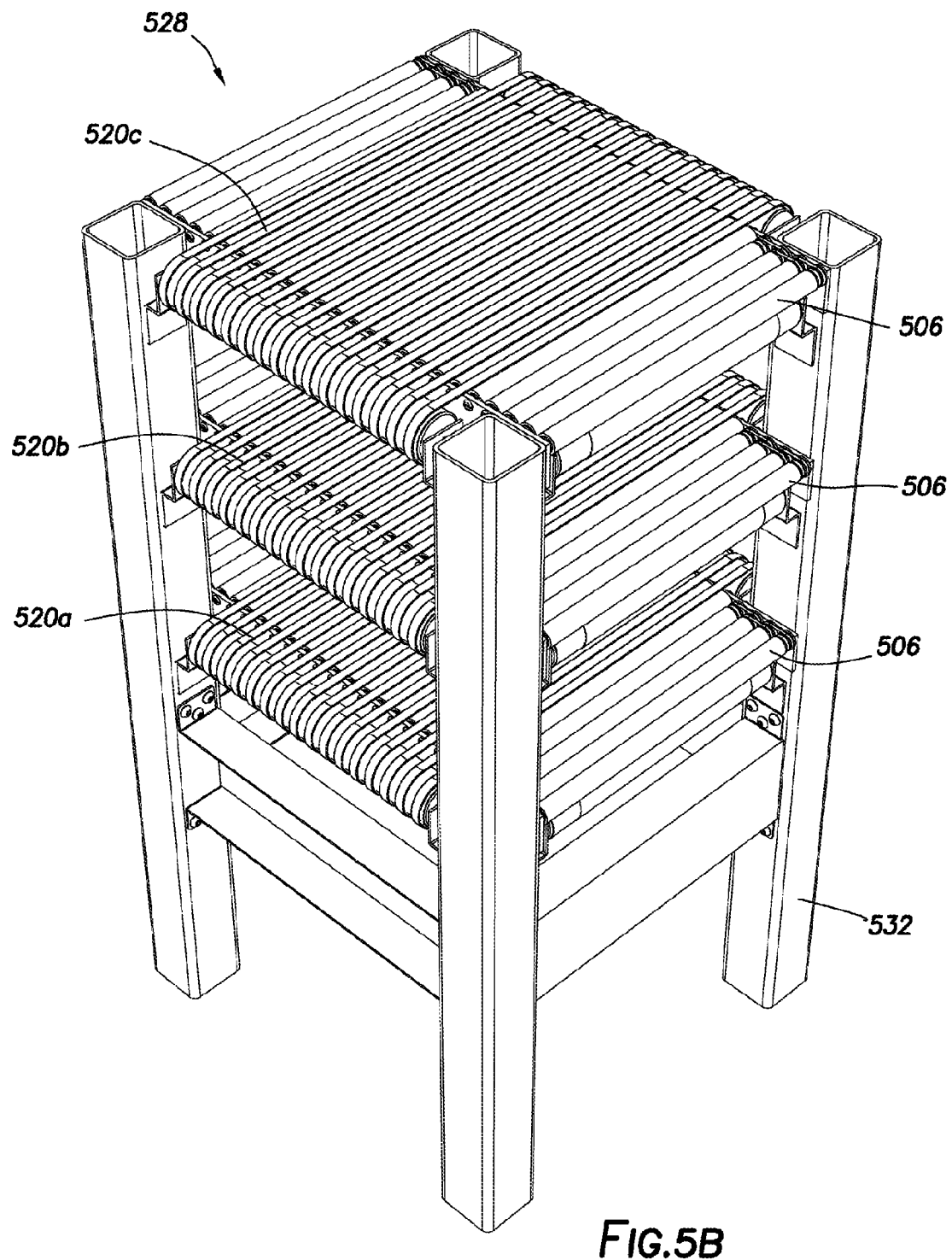
Figure 5C:
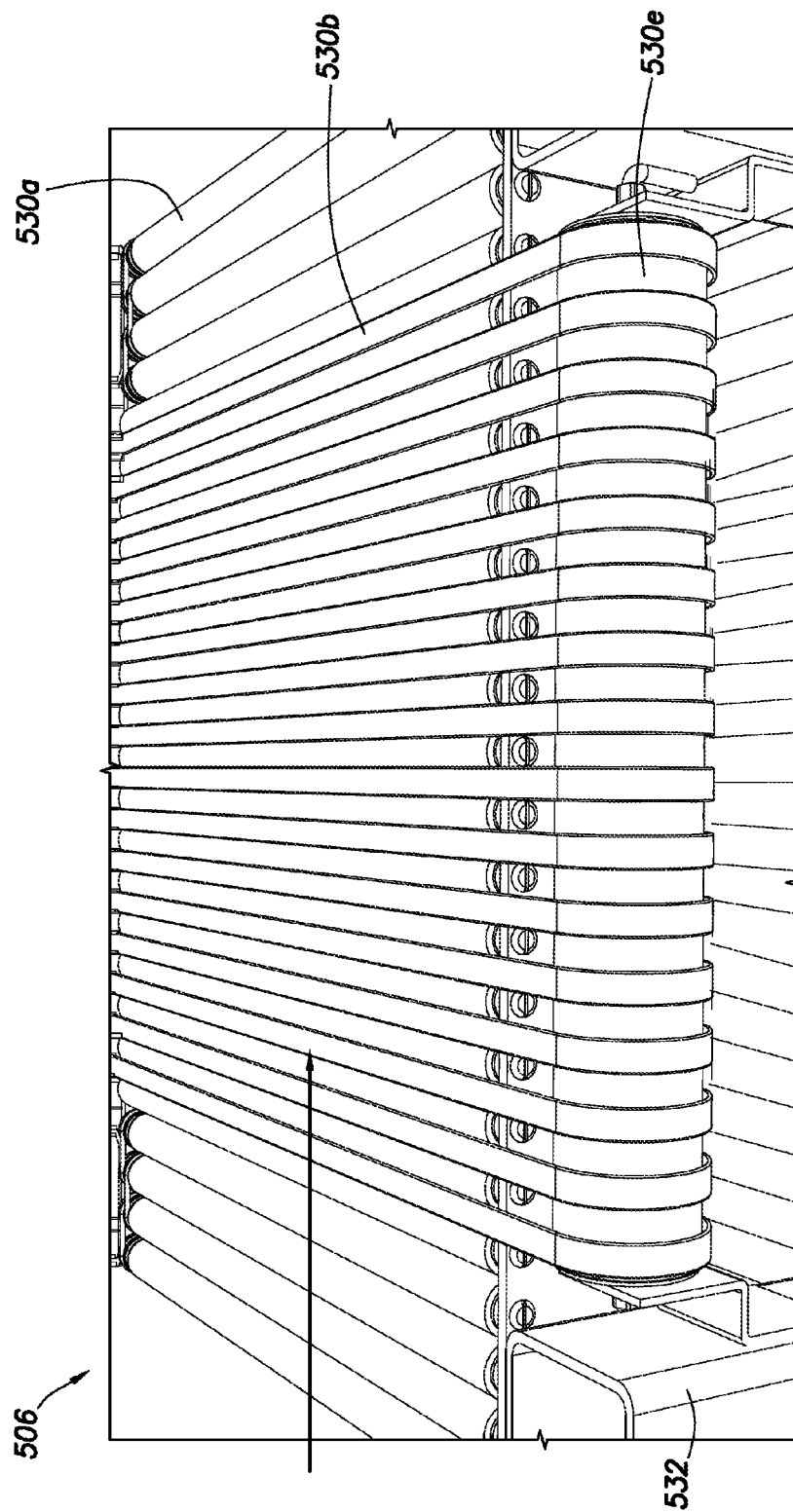
Figure 5E:
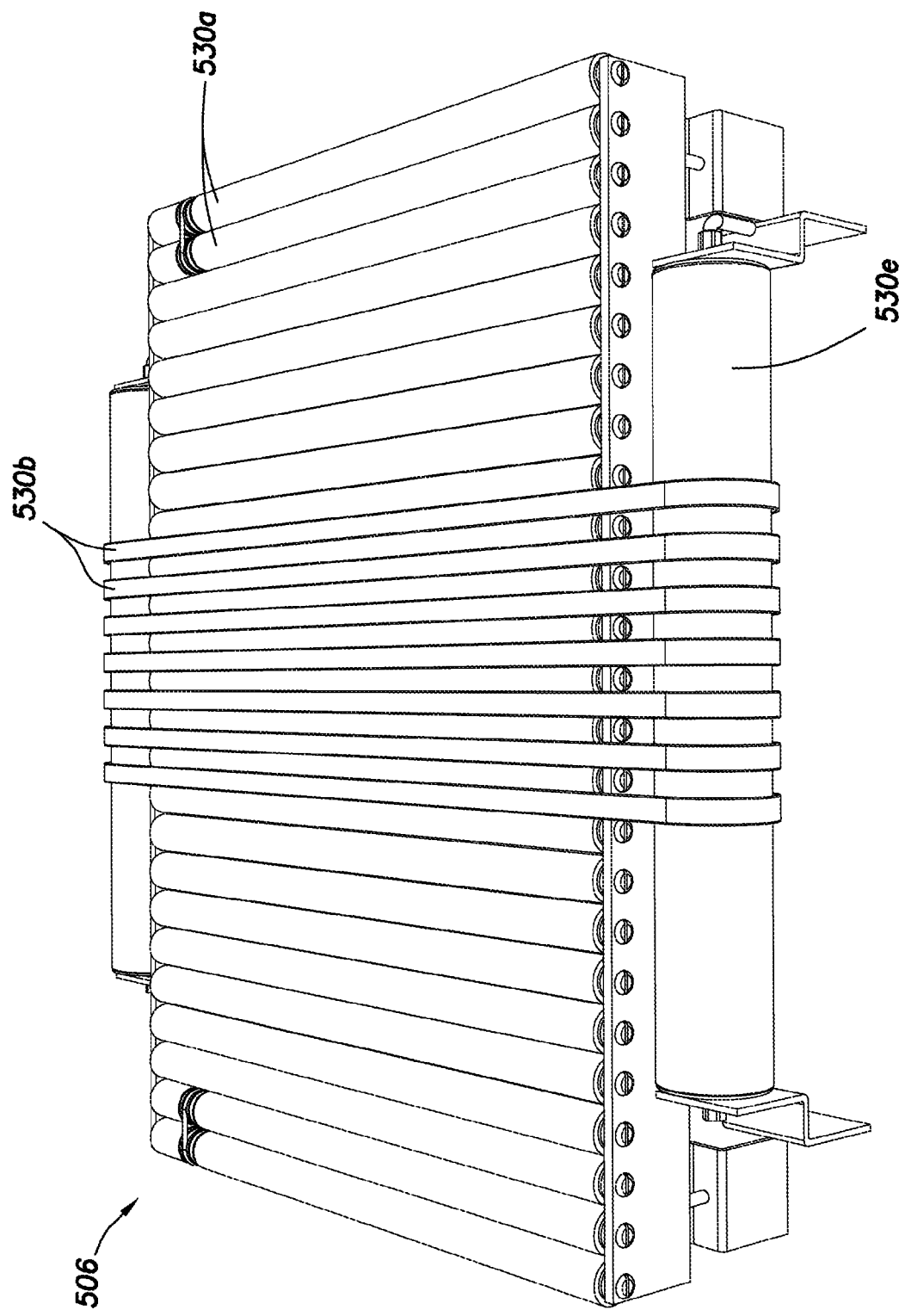
Figure 5G:
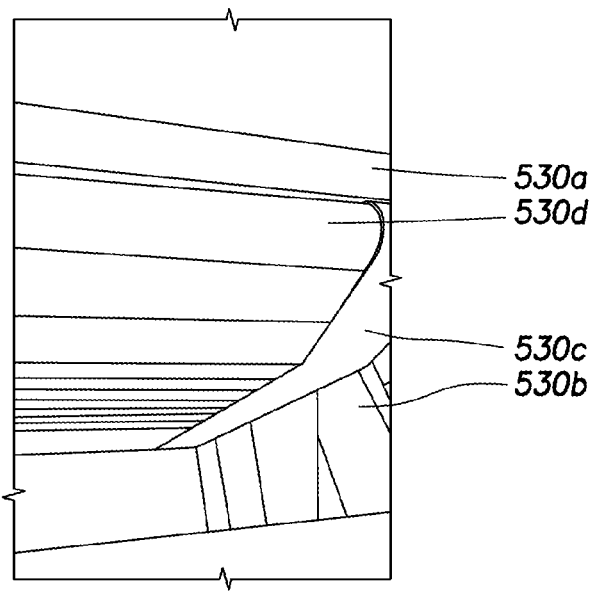
Figure 5H:
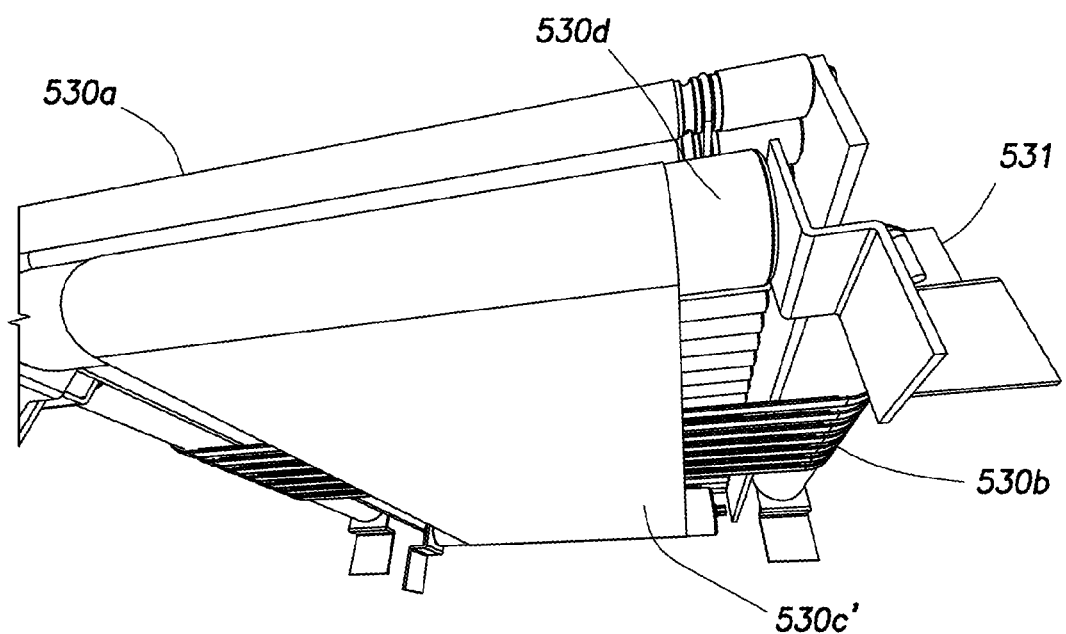

As shown in FIGS. 5A-5H, the diverter unit 528 may be connectable to, or integral with, the conveyor(s) for transferring a variety of the cases. FIGS. 5A and 5B show a modular, multi-level (or stacked) diverter unit 528 positionable adjacent to a conveyor and/or bin to transfer the cases. FIGS. 5C-5F show a portion of the diverter unit 528, including a diverter 506 having rollers 530a and crossbands (or belts) 530b. FIGS. 5G and 5H show a bottom of the diverter 506 depicting a bottom belt 530c and lower (or headstock/tailstock) rollers 530d. FIG. 6 shows a more detailed view of the diverter 506 depicting the rollers 530a,d, the crossbands 530b, and the bottom belts 530c.

The diverter unit 528 as shown in FIGS. 5A and 5B includes a three level frame 532 with three diverter layers 520a-c. The frame 532 as shown includes vertical supports with crossbars to rotationally support rollers 530a of the diverters 506 thereon. Each diverter layer has a diverter 506 thereon for transferring the cases to respective conveyor levels and/or bins. While three levels are shown as being vertically stacked to correspond to the three levels of the conveyors 320a-c, 324a-c of FIGS. 3A-3D, any number of diverters 506 may be provided to correspond with respective conveyors. Other features, such as feet (FIG. 4C) may optionally be provided.

FIGS. 5A-6 also show the 'interlaced' (or interlinked) configuration of the diverter 506. As shown in FIGS. 5C and 5D, the diverter 506 has the rollers 530a supported along the frame 532 by a bracket 531. The rollers 530a are positioned to define a primary path in a first, main direction alignable with the path of an adjacent conveyor as indicated by the wide arrow. The rollers 530a may be fine pitch rollers oriented perpendicular to the direction of travel. This arrangement may incorporate portions of a conventional roller conveyor, and may have roller diameters smaller than conventional rollers having a 1.9" (4.826 cm) diameter set on a close pitch or small distance between rollers in order to handle regular or irregular cases (e.g., items packaged without flat bottom surfaces).

As shown in FIGS. 5C-5F, the crossbands 530b of the diverter 506 are in a position transverse to the rollers 530a (i.e. non-aligned with or diverted away from the main path). Multiple crossbands 530b run between the rollers 530a of the diverter 506. The cross section of each crossband 530b is designed to fit in the small space between the rollers 530a. The crossbands may be positioned between the rollers 530a and may travel about 90 degrees to the flow of items to divert. The crossbands may be reversible and/or capable of rotating to the left or right in relation to the main flow of the diverter and/or conveyor path.

The crossbands 530b may be raised and lowered and/or the crossbands 530b may be provided with cam portions as needed to perform a diversion or transfer operation. Upon raising the crossbands 530bc, the direction of the cases is shifted from the main direction (wide arrow) to the transverse direction (as indicated by the narrow arrow). This diverter 506 may be used to lift and push items at settable angles (e.g., from about 20 to about 90 degrees) from the adjacent main conveyor.

The crossbands 530b are interlaced with the bottom belt 530c and rotationally supported on the pulley rollers 530e. The crossbands 530a may be supported and driven by the pulley rollers 530e supported on the frame 532 on either end of the conveyor rollers 530a. At least one of the rollers 530e may be powered to rotate the crossbands 530b. To maintain alignment of the crossbands 530b, tracking in relation to a centerline of each crossband 530b between the rollers 530a may be controlled by pulley side walls, belt roller grooving, and/or the natural groove of the space between rollers 530a.

Drive (headstock/tailstock) rollers 530d are supported on the frame below the rollers 530 and rotationally drive the bottom belt 530c. A motor (not shown) may be provided to rotationally drive the drive rollers 530d. The bottom belt 530c is supported and tensioned by the drive rollers 530d with optional additional tension rollers. The bottom belt 530c is driven by at least one of the rollers 530d to drive the rollers 530a. Additional rollers may be used as tensioners and/or to increase the cross sectional area for the crossbands 530b to pass through.

The diverter 506 may be provided with interlaced crossbands 530b and bottom belts 530c, c' as shown in FIGS. 5G and 5H. FIGS. 5G and 5H show a bottom view of the diverter 506 having the crossbands 530b passing through the bottom belt 530c, c'. The bottom belt 530c may extend along a narrow portion of the drive rollers 530d as shown in FIG. 5G, or extend along a wide portion of the drive rollers 530d as shown in FIG. 5H.

To achieve a compact cross section and simplify both construction and assembly, the main conveyor rollers 530a may be driven by the bottom belt 530*c* (or by a belt under roller) common in the industry. The crossbands 530*b* may pass through the bottom belt 530*c* like chain links on a large link. As shown, the crossbands 530*b* pass through the bottom belt 530*c* at about 90 degrees (or perpendicular) to the bottom belt 530*c*.

In the example shown by FIG. 6, the main conveyor rollers 530*a* are smaller diameter rollers as compared to the drive rollers 530*d* on the bottom belt 530*c*. The bottom belt 530 may not extend to an outer portion of the main conveyor rollers 530*a*. The outer portions of the rollers 530*a* may be driven by O-ring belts 630 and a line shaft pulley 536. Interference between the crossbands 530*b* and the O-ring belts 630 on the outer portion of the rollers 530*a* may be avoided by placing the crossbands 530*b* in a middle portion of the rollers 530*a*. The main conveyor rollers 530*a* can be driven with the line shaft pulley 534, and the crossbands 530*b* supported by the bottom belt 530*c*. The belt 530*c* may be formed of a rigid strip of low friction material.

The diverter 506 may also be provided with various options, such as main rollers 530*a* driven by the line shaft pulley and supporting the crossband 530*b* with wear strips. A motor 536 may be provided to drive the line shaft pulley 534, thereby rotating the O-ring belts 630 and the corresponding rollers 530*a*. This motor may also optionally drive the pulley rollers 530*e* and/or the crossbands 530*b*.

The configuration of FIGS. 5A-6 may be used, for example, to increase weight handling capabilities while balancing costs, assembly time, and cross making of stacked sorters. The diverters described herein may incorporate other features, such as features of diverters (and/or transfer devices) described in US Patent/Application Nos. US2015/0144536 and US20160083196, the entire contents of which are hereby incorporated by reference herein.

Raised Crossband

The conveyors and/or diverter herein may be used with a variety of belts, such as crossbands, having cam portions (e.g., ramps or wedges) to facilitate movement of the cases about the handling system. A cam portion (or ramp) may be provided along the crossband to divert the cases between locations about a conveyor. The crossband may be part of a sorter, diverter, or other type of conveyor. The cam portion may be provided at various locations along the crossband to divert from one conveyor to another. The crossband may have a modular or integral cam portion shaped to push items from the conveyor to locations as needed. The cam portion may be shaped and/or configured to facilitate movement of cases as desired. Such configuration may be designed to facilitate handling of regular and/or irregular packages about various configurations of conveyor equipment.

Figure 7A:
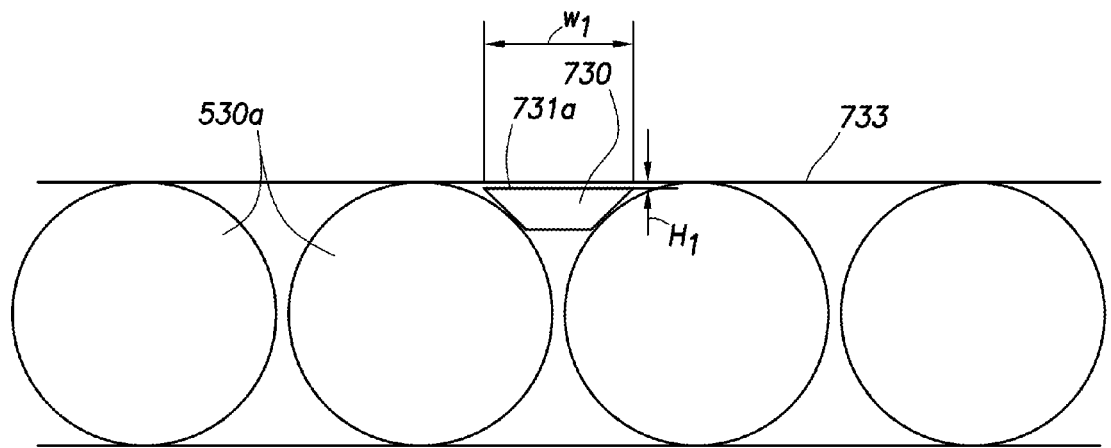
FIGS. 7A-7B are schematic diagrams of the diverter showing base and cam portions of a crossband, respectively.
Figure 7B:
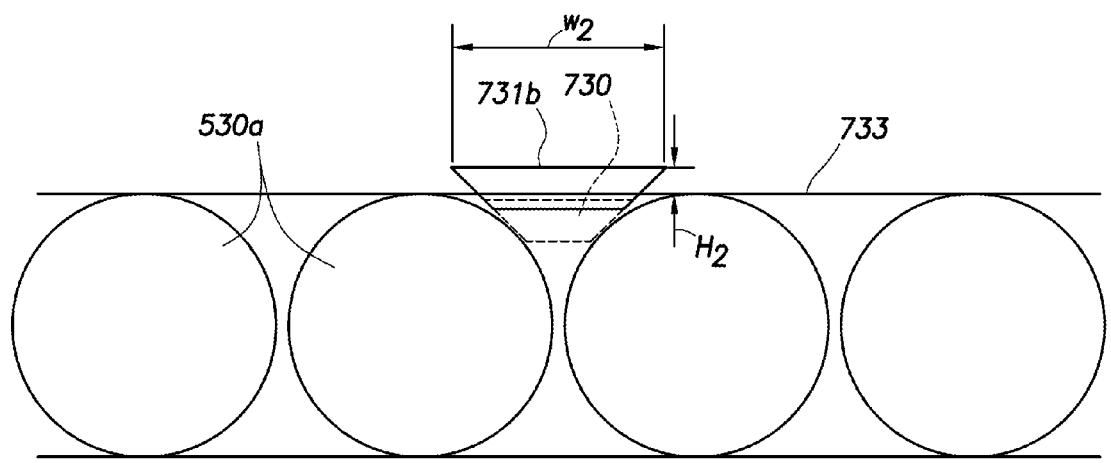

FIGS. 7A-7B show various configurations of a variable width crossband 730 having a base (or lower) portion 731*a* and a cam portion 731*b*. FIGS. 8A-9B show various configurations of a crossband 830, 930 having a base portion 831*a*,931*a* and a cam portion 831*b*, 931*b*, respectively. The crossbands are usable with the diverters and/or conveyors described herein.

As shown by FIGS. 7A-7B, at least a portion of the crossband 730 may be provided with an outer surface along the cam portion that extends above a conveying surface 733. The conveying surface 733 is a line defined along an outer surface of (or the tangent line connecting) the rollers 530*a* to support the cases thereon. The cam portion 731*b* may be used to divert the cases to various locations about the handling system, such as to a bin location extending laterally from the main conveyor. The cases may be passed by the crossbands from an end of the diverter to an adjacent conveyor or dropped into an adjacent bin.

FIGS. 7A and 7B show cross section views of a portion 7A of the diverter 506 of FIG. 6 showing the crossband 730*b* having a base portion 731*a* in a recessed position (below the conveying surface 733) and a cam portion 731*b* in a raised position (above the conveying surface 733), respectively. As shown in the recessed position of FIG. 7A, the base portion 731*a* of the crossband 730*b* may ride in the small space between adjacent rollers 530*a*. The crossbands may be specially designed with a cross section that makes contact with the rollers 530*a* in such a way that the case does not spin or cause a jam between rollers 530*a*.

This crossband 730*b* sits between the main rollers 530*a* below the conveying surface 733. An outer surface of the crossband 730 is positioned parallel to the conveying surface 733. Slanted side surfaces are positioned on opposite lateral ends of the crossband 730 and are shaped to conform to an outer surface of the rollers 530*a*. The rollers 530*a* may act as guides to support the crossband and keep the crossband tracking properly. The crossband 730 may be shaped to fill the space between the rollers 530*a*.

FIG. 7B shows the cam portion 731*b* of the crossband 730 positioned to lift and transfer the case. In this raised position, the outer surface of the crossband 730 is positioned above the conveying surface 533. Cases positioned on the raised crossband 730 may be driven by rotation of the crossbands 730 to a location off of a side of the diverter 506.

As shown by FIG. 7B, the crossband 730 may have width (and/or gauge) that changes at different positions as indicated by the dashed and solid lines to provide a lifting and/or pushing effect as the crossband 730 rides along the rollers 530*a*. The crossband 730 may have a variable width that varies from width W1 along the base portion 731*a* of the crossband 730 and a width W2 along the cam portion 731*b* of the crossband, and a variable height H1, H2 along the base and cam portions, respectively.

At full width the crossband 730 may almost be touching, thereby creating a continuous surface like one continuous crossband 730 for maximum contact surface with extremely hard to handle items. The crossband 730 may be configured to reduce the number of parts, and create space between rollers 530*a* while preventing wedging of the crossband 530*b*, facilitate handling of light and odd shaped packages, and handle various weights of cases.

The crossband 730*b* may have a loop shaped body that gradually increases in width in order to raise the height and then decreases back to its original profile as the crossband 730 rotationally advances between the base portion 731*a* of FIG. 7A and the cam portion 731*b* of FIG. 7B. When rotated between the rollers 530*a*, the increased width may act as a ramp and/or wedge lifting and pushing against a natural ramp space between the rollers 530*a*. An end of the cam portion 731*b* may have an incline (or wedge or ramp) to liftingly and/or pushingly engage the cases. The crossband 730 may ride up on top of the rollers 530*a*, and the crossband 730*b* may lift under the case to be transferred.

The cam portion 731*b* may have gradual slopes of each side of the cam portion 731 that engages the case 108 to be transferred (i.e. pushes the case across). The cam portion 731 may be used to push the case 108 from one side to transfer or lift the case and carry over to the other side of the diverter 106. This 'lift and carry' function may occur by increasing the crossband 730 dimension under the case 108 as the crossband 730 rotates in the gap between the rollers 530*a*. As the cam portion 731 increases above the rollers 530*a* the case 108 lifts and carries to the side of the diverter 106.

Crossbands can also be under tension and adjusted to minimize contact with the rollers 530*a*. When in the recessed position, the outer surface of the crossband 530*b* may sit below the top conveyor surface 733 of the rollers 530*a* so that cases convey across the rollers 530*a* without snagging or slowing by contact with the crossband 730.

FIGS. 8A-8C and 9A-9C show example the crossbands 830, 930, each having a loop shaped body with the base portion 831*a* and the cam portion (or ramp) 831*b*. As shown in this view, the crossband 830 may have a length L, which may be greater than a length of the case transferred. The cam portion 831*b* in a cross section of the crossband 830 may occur on part (e.g., a smaller percentage of the crossband) or more of the crossband 830. The cam portion 831*b* may cause the outer surface of the crossband 830 to be raised above the conveying surface (i.e. top conveyor/tangent line across the conveyor rollers 530*a*) as the crossband 830 is rotated in the space between the rollers 530*a*. The cam portion 831*b* may be contoured or ramp on one or both sides, and/or have generally the same in length and height for each crossband.

Figure 8A:
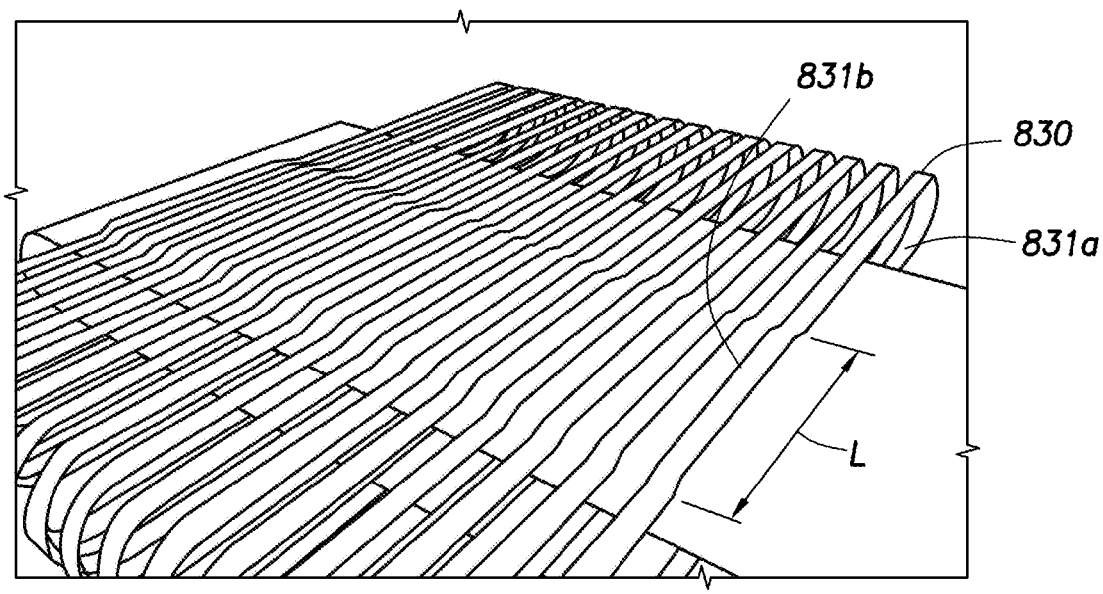
FIGS. 8A-8C are schematic views of the cam portion of the crossbands of the diverter.
Figure 8B:
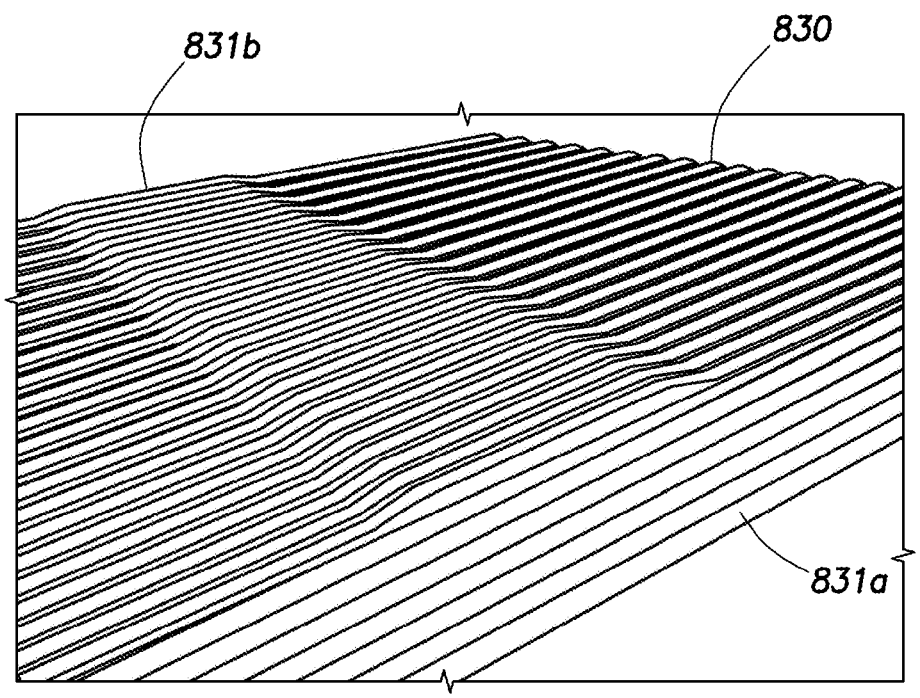
Figure 8C:
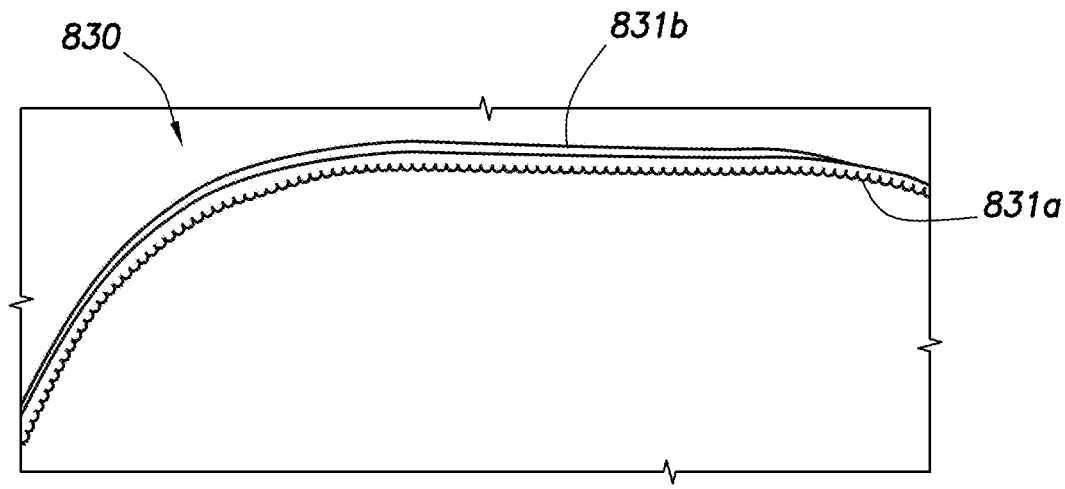

In the example shown in FIGS. 8A-8B, multiple parallel crossbands 830 are in rotational synchronization with each other. As shown in FIGS. 8C and 8D, the crossbands 830 may have a toothed inner surface on the underside of the crossband 830 that engages with a matching toothed (or cogged) surface on at least one of the supporting rollers or pulleys (e.g., roller 530*e* of FIGS. 5E-5F) that can be used to maintain a position of the crossbands 830. For example, the crossbands 830 may have toothed inner surfaces driven by a toothed pulley so the crossbands 830 do not slip and remain in sync with one another. The crossbands 830 may be set on the cogged drive rollers (e.g., 530*e*) to be in sync with each other. This may be used to align the crossbands 830 so that the cam portion 831*b* of each of the crossbands 830 of the diverter 106 remain aligned as shown in FIGS. 8A and 8B.

Figure 9A:
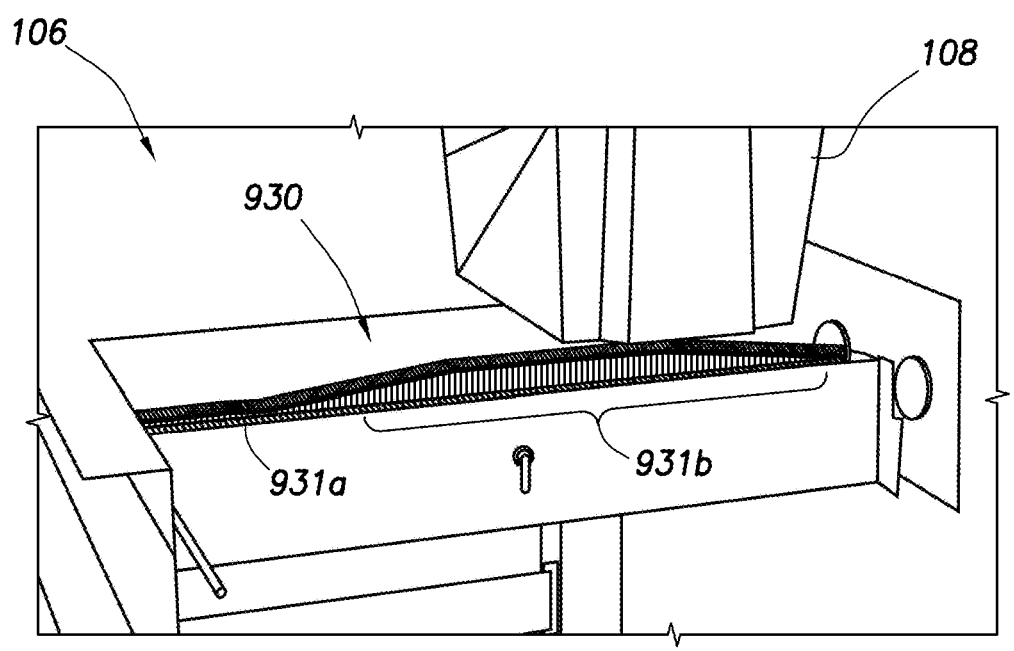
FIGS. 9A-9C are schematic views of portions of a diverter with segmented crossbands.
Figure 9B:
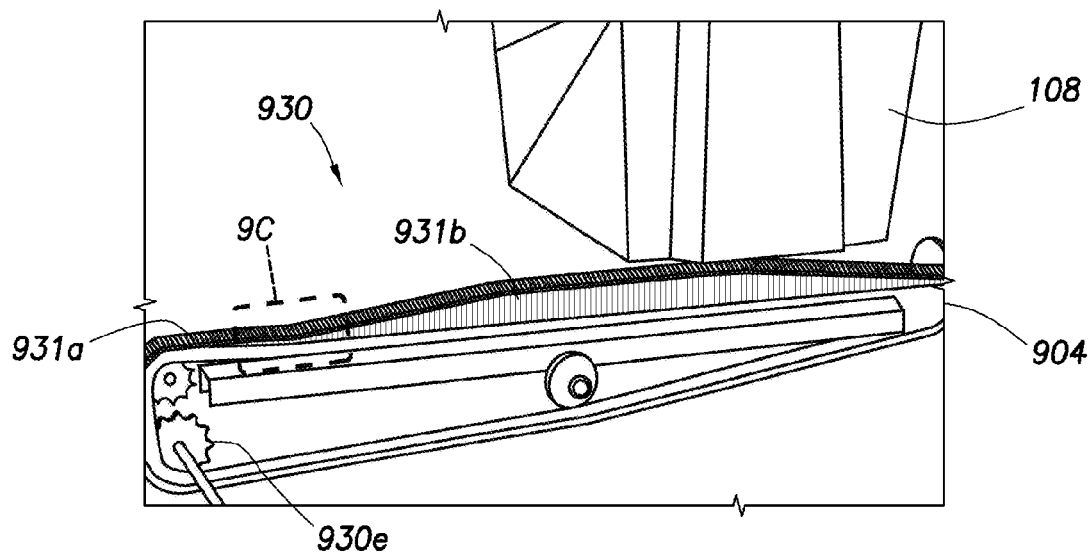
Figure 9C:
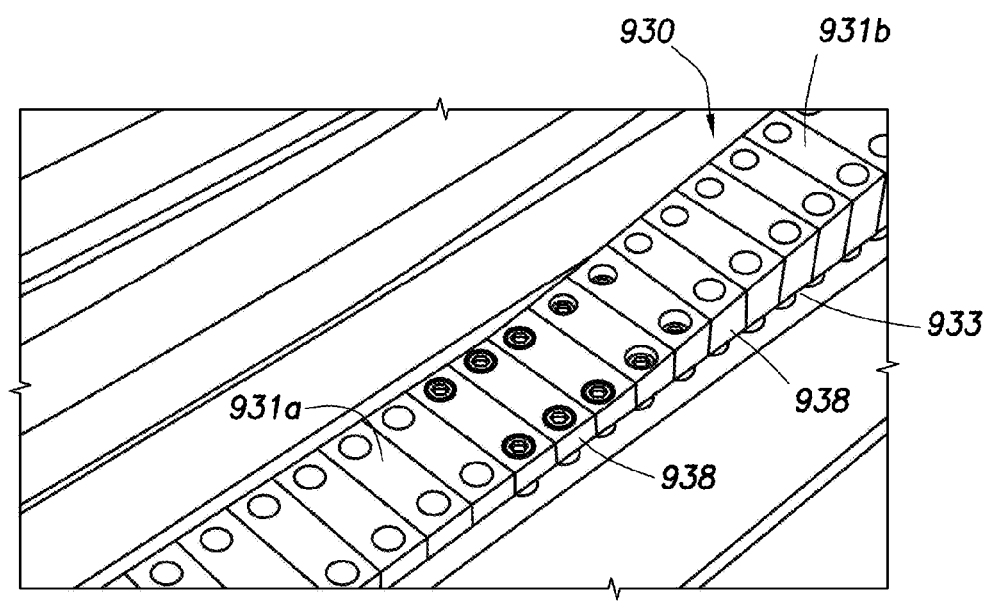

The crossband 830 may be a unitary member, such as a continuous loop, as shown in FIGS. 8A-8C, or a segmented crossband 930 as shown in FIGS. 9A-9C. In 9A-9C, the crossband 930 is shown as a chain 933 forming a loop with various height pieces (or segments) 938 attached thereto to achieve the ramp affect and define the cam portion 931*b*. With this segmented configuration, interchangeable modules may be used to define the shape of the crossband 930. The segments 938 in this version are plastic spacers bolted to links of the chain crossband 933. Features, such as wear strips, the chain and/or sprockets may be provided on the rollers 930*e* for rotating the chain crossband 933 about the diverter 906.

As shown in FIG. 9A-9B, the segmented crossband 930 may be used for the case (e.g., tote or box) transfers. These figures show a regular case 108 passing over the diverter 106 and driven by advancement of the cam portion 931*b* of the crossband 930 to push the case 108 in the transverse direction along the diverter 106. One or more segmented crossbands 930 may be used to transfer.

As shown by FIGS. 9A and 9B, applications for transferring the cases 108 with relatively easy configurations (e.g., handle flat bottom items such as totes and boxes) can use a simple raised crossband configuration and eliminate cost and complexity through elimination of complex lifting mechanisms. A simple rotation of two or three crossbands 930 can often be used to quickly transfer cases (e.g., boxes and totes) 108. Various configurations of diverters with crossbands may permit the use of one or more such crossbands.

Figure 10A:
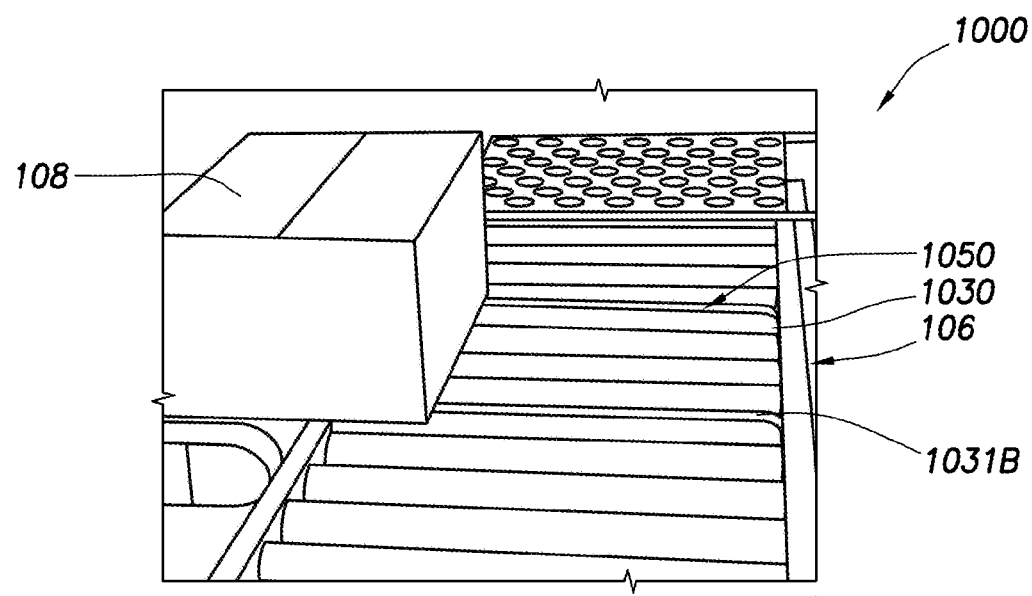
FIGS. 10A-10D are schematic views of various types of diverters having crossbands with cam portions.

FIGS. 10A-10D show a portion of a handling system 1000 with conveyors 1020 used in combination with a diverter 106. As shown in FIG. 10A, the diverter 106 may be provided with a lift mechanism 1050 to change height to engage and or lift the case 108 above the rollers 530*a* for transfer. The lift mechanism 1050 of the diverter 106 may include belts, chains and belts or other devices to lift and transfer the cases 108. In this example, the crossbands 1030 are lifted above the conveyor 1020, but may be in configuration where the cases are lifted with the assembly.

Figure 10B:
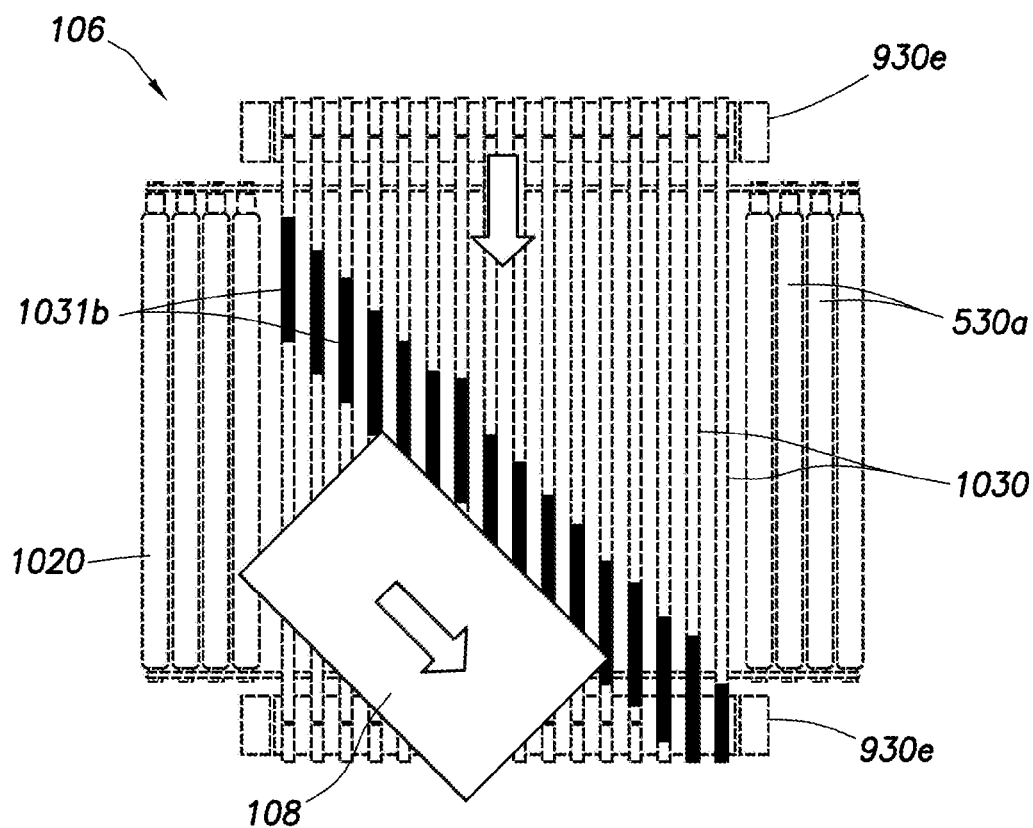

As shown in FIG. 10B, the lifting mechanisms may be simplified to provide crossbands 1030 capable of lifting the cases 108 in a way that eliminates the lift mechanisms for lifting the entire assembly. The simplified crossband configuration may provide reduced height, reduced cost, and increased speed capabilities. As shown in FIG. 10A, the diverter 106 has multiple crossbands 1030 with the cam portions 1031*b* arranged to manipulate the use of the cam portions (i.e. ramps) 1031*b* to divert the case 108. As the case 108 arrives, the crossbands 1030 rotate to drive and steer the case 108.

The cam portions 1031*b* can be staggered or aligned for various divert angles as shown in FIGS. 10B and 8A, respectively. The cam portions may be aligned as shown in FIG. 8A, or positioned at an angle to each other determined by the stagger of the crossbands to maintain orientation of the case 108 as shown in FIG. 10B. In the version of FIG. 10B, the cam portions 1031*b* of the crossbands 1030 are staggered to drive the cases 108 in an angled direction away from the main conveyer 1020 (main conveyor path or flow is shown left to right) to divert the cases 108 to a desired location.

Figure 10C:
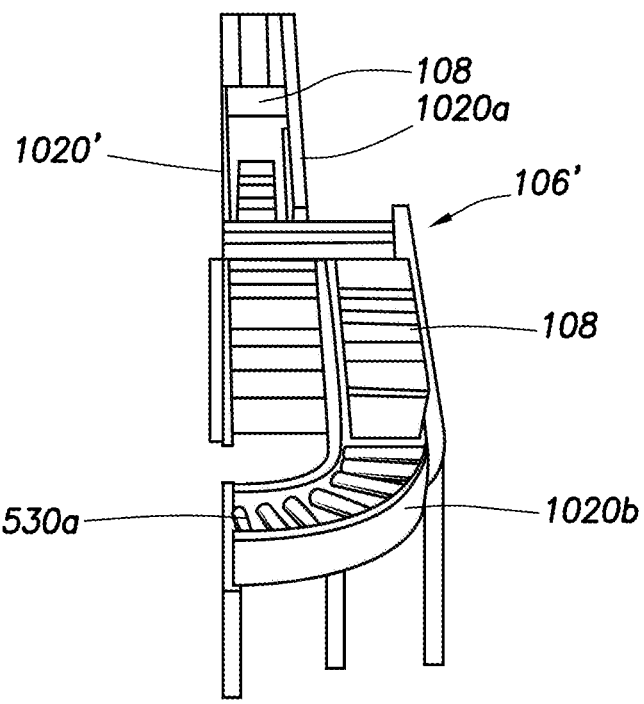
Figure 10D:
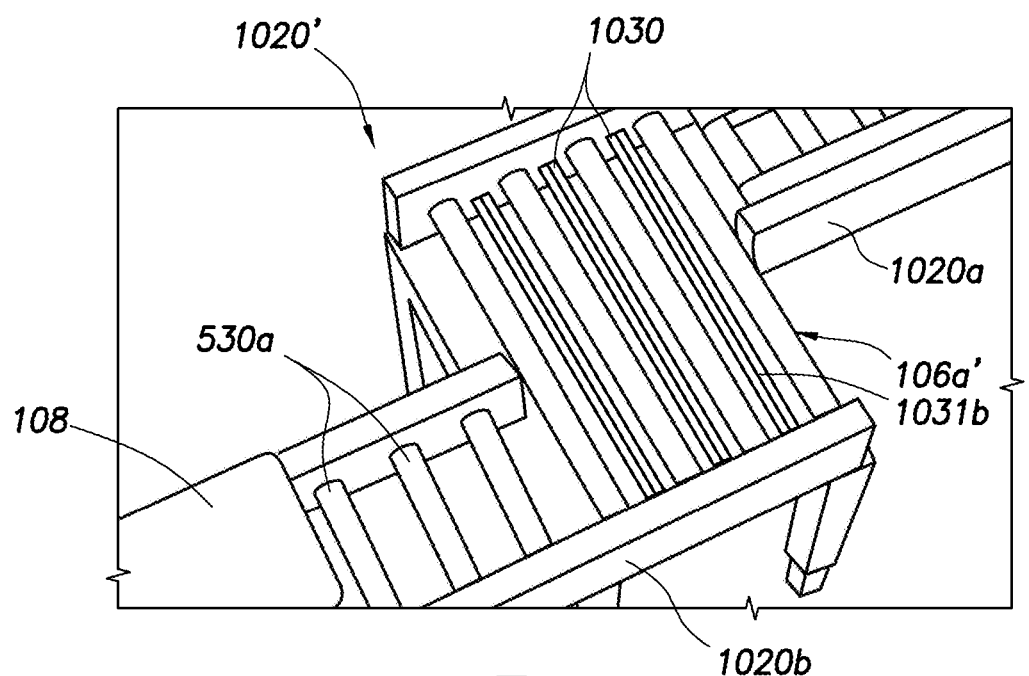
Figure 11A:
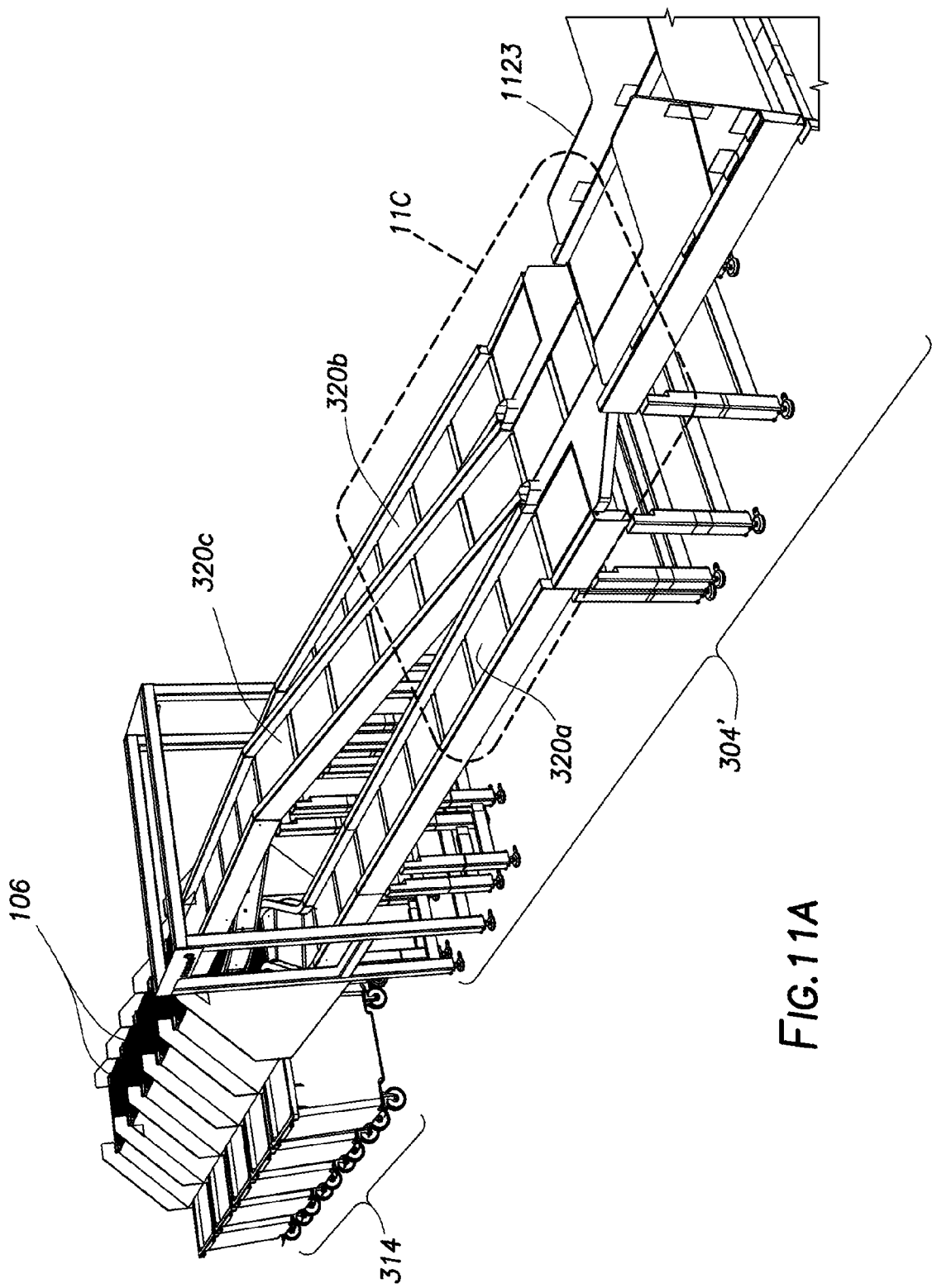
Figure 11C:
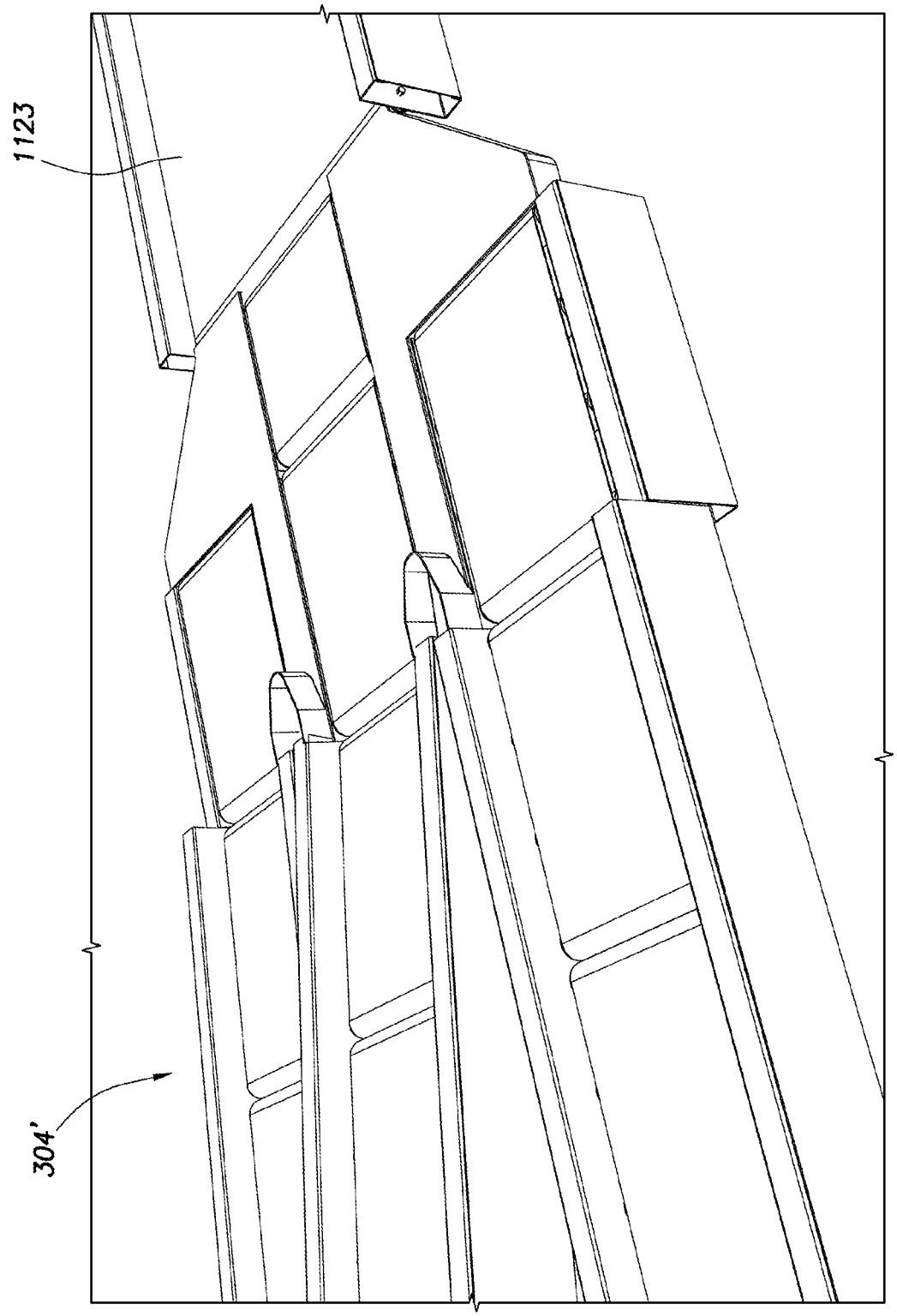
Figure 11D:
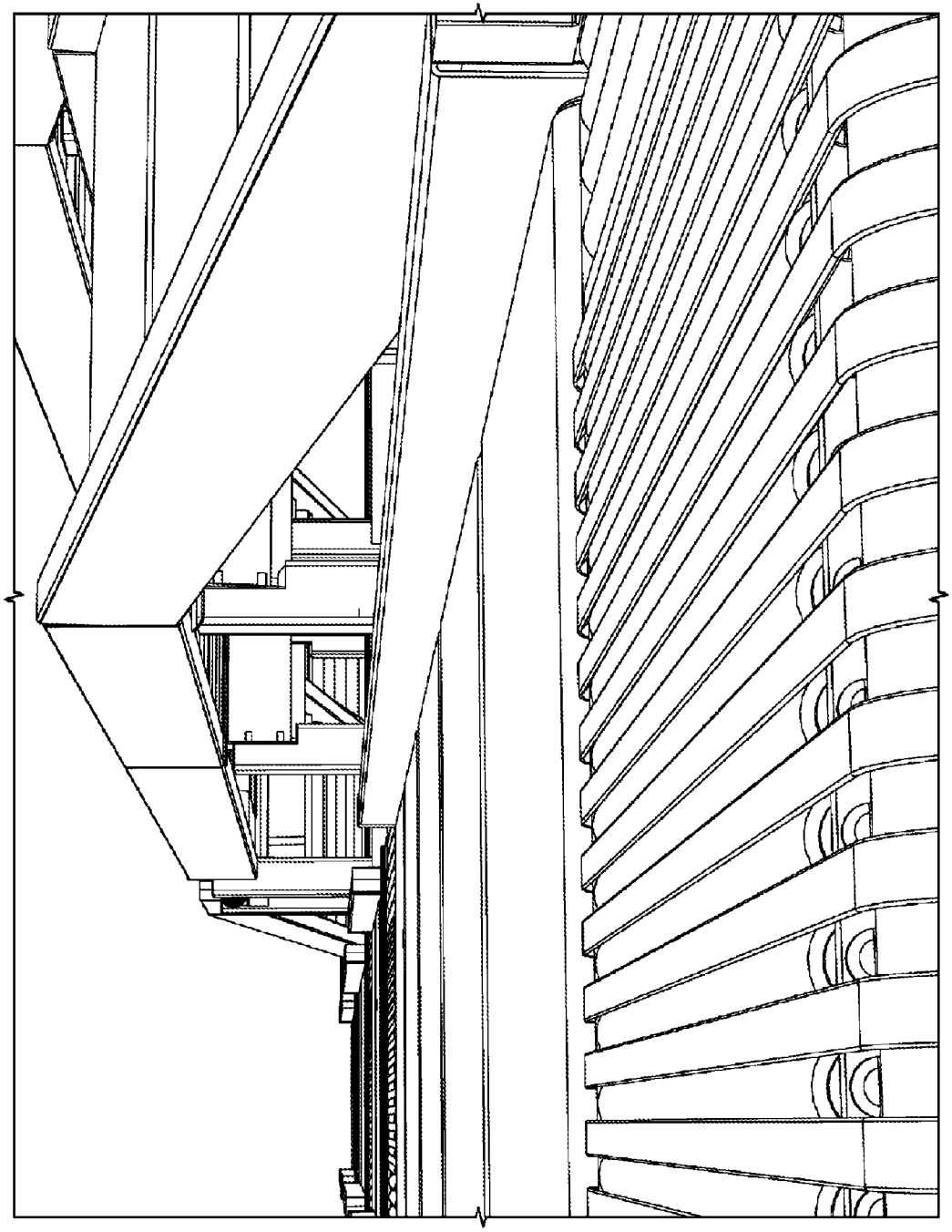
Figure 12A:
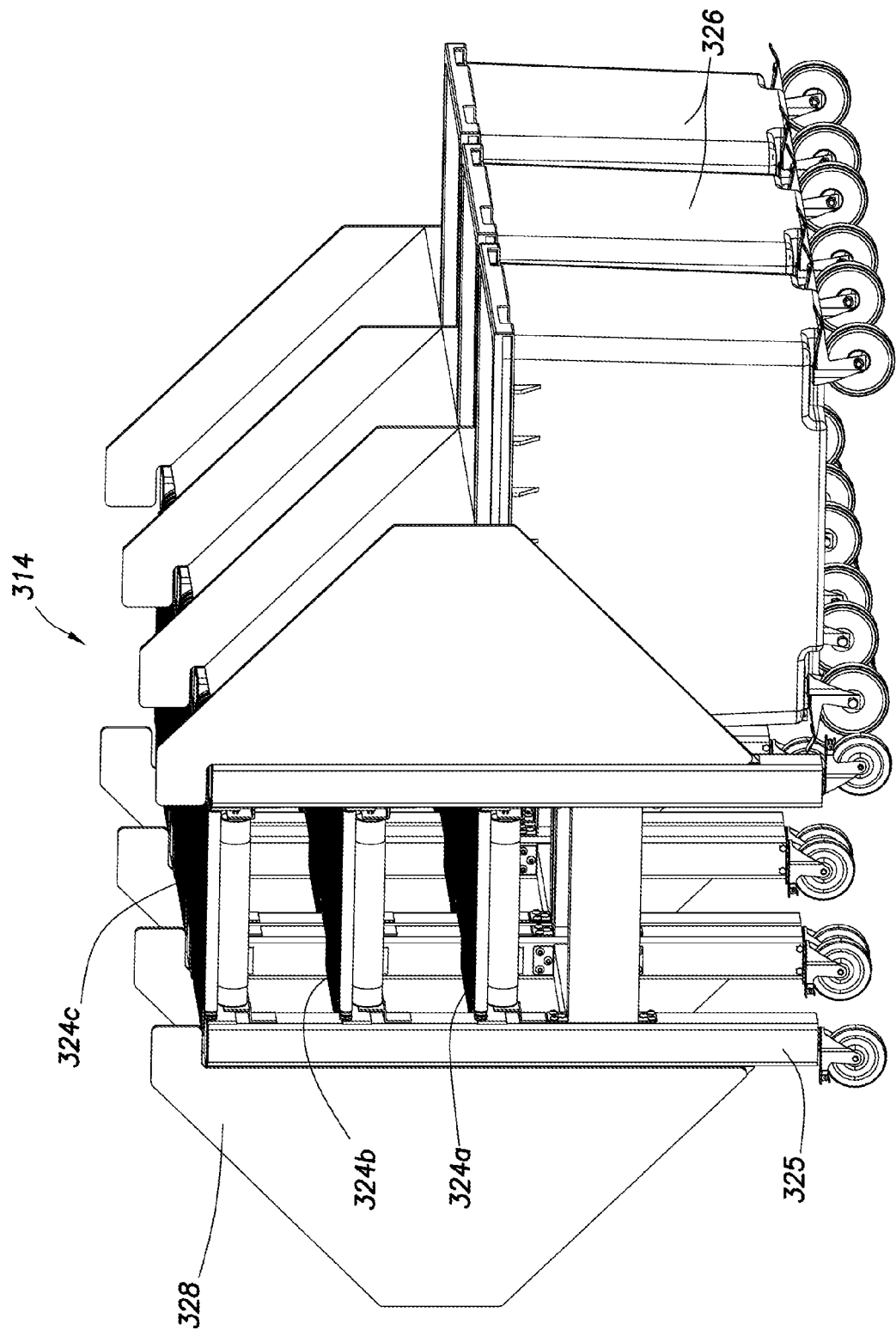
FIGS. 12A-12D are schematic views of various configurations of the multi-level sorters in a stacked conveyor configuration.
Figure 12B:
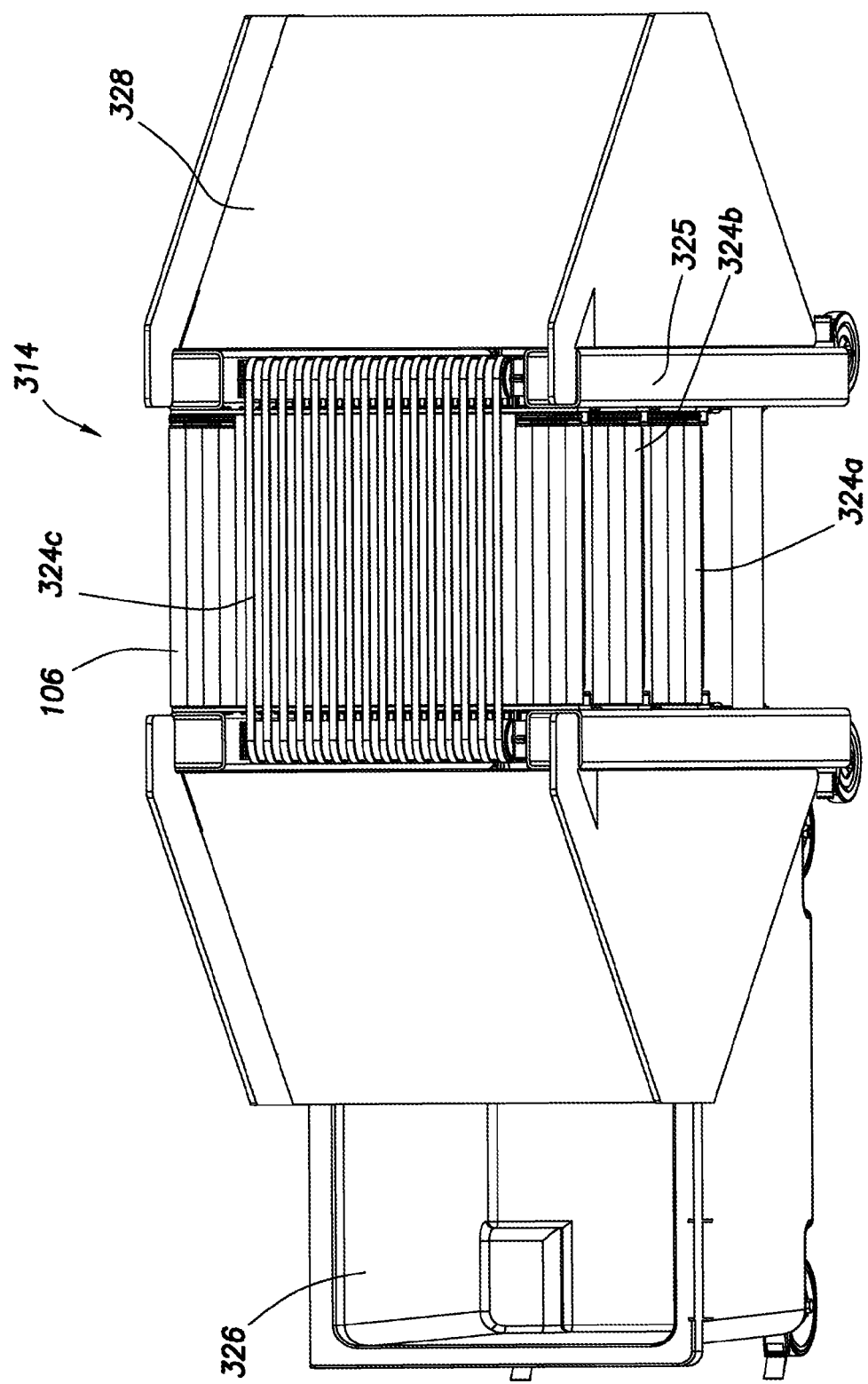
Figure 12C:
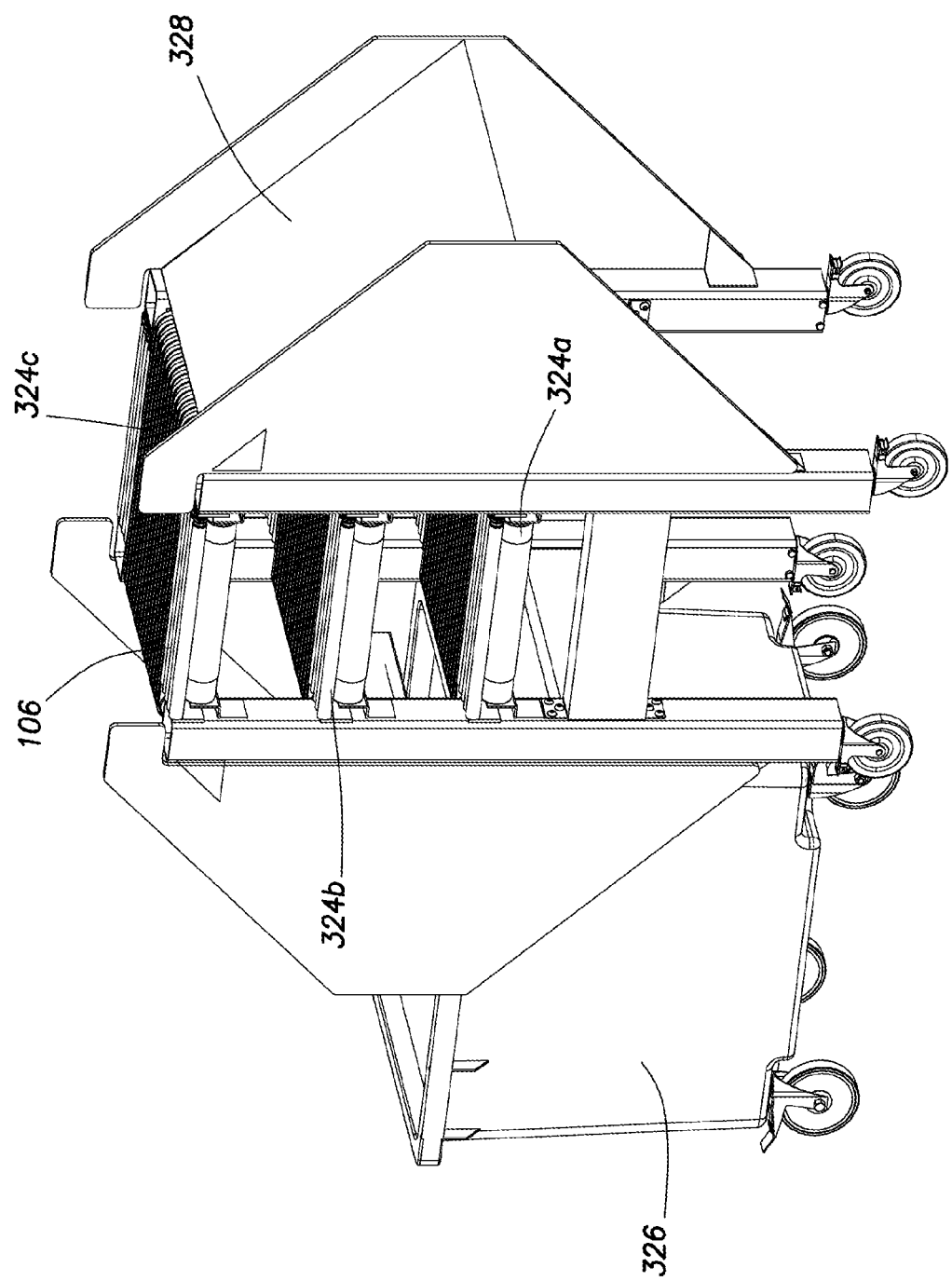
Figure 12D:
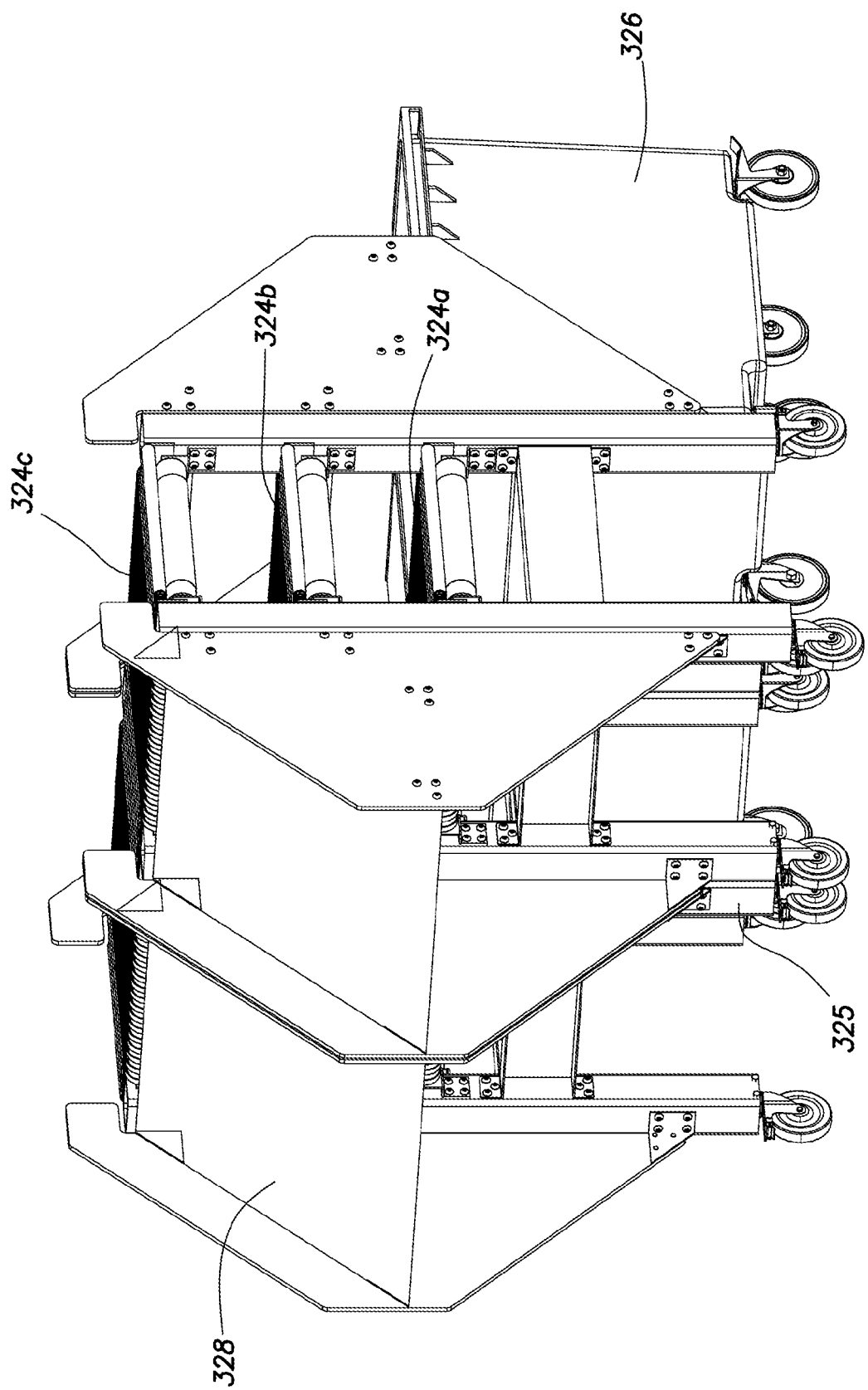
Figure 13A:
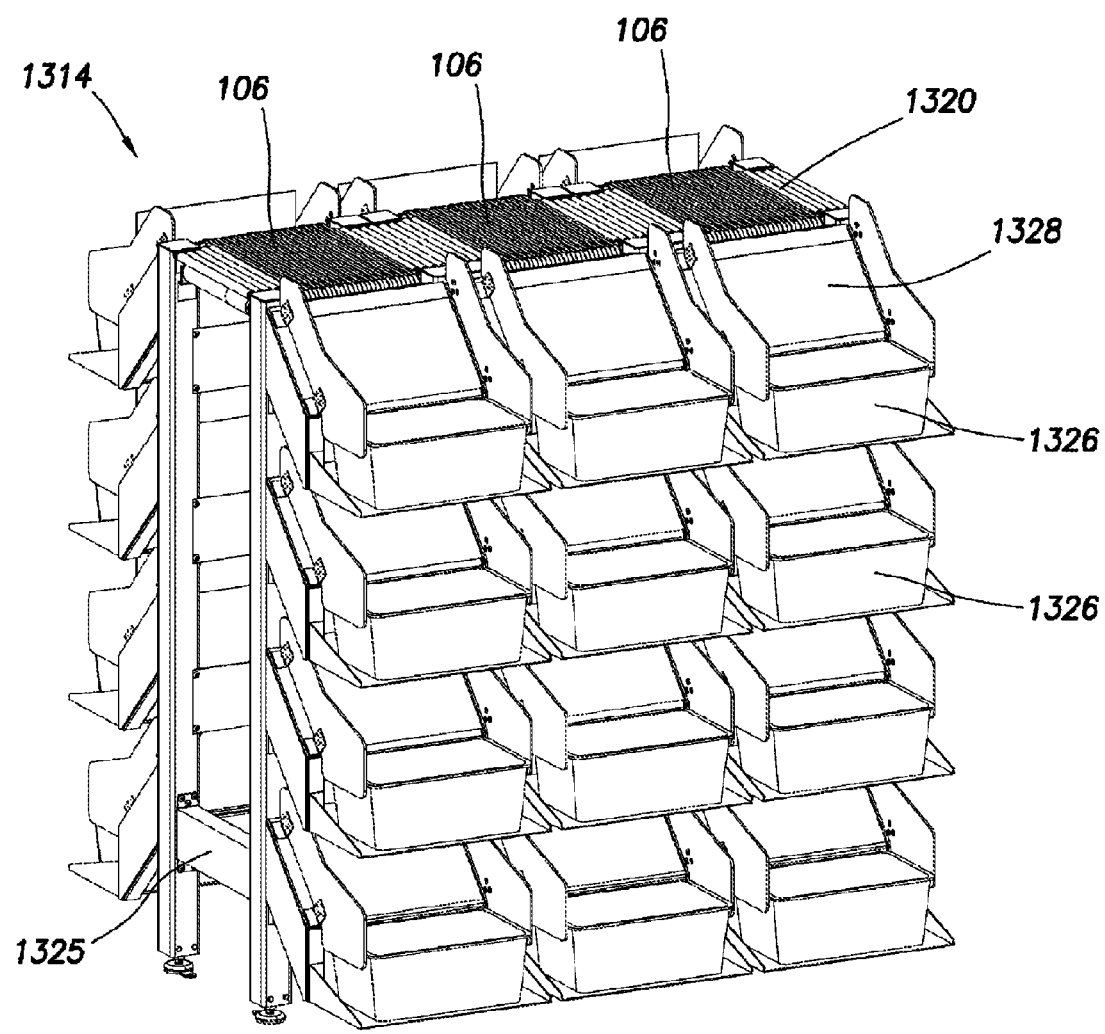
Figure 13B:
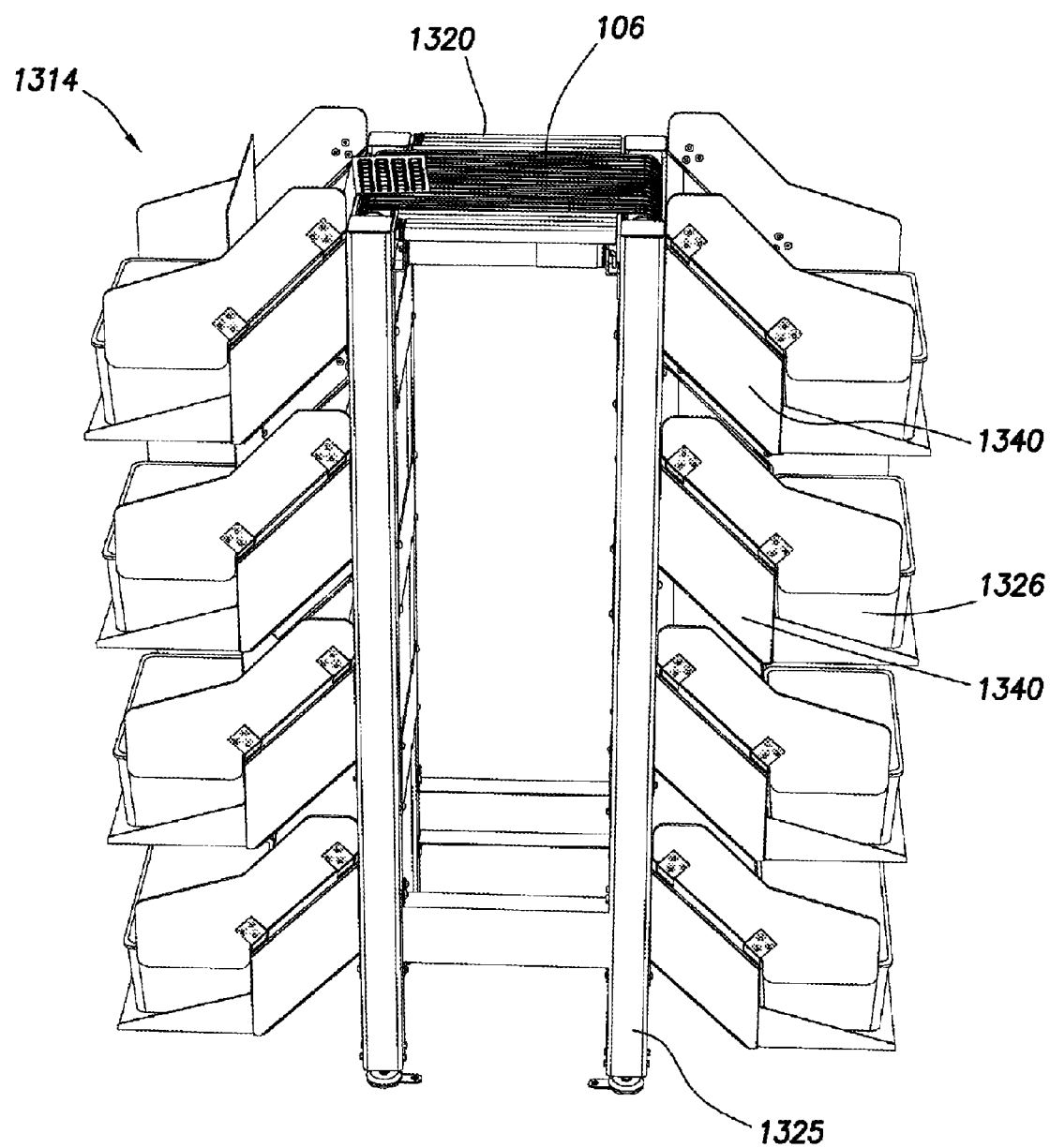
Figure 13D:
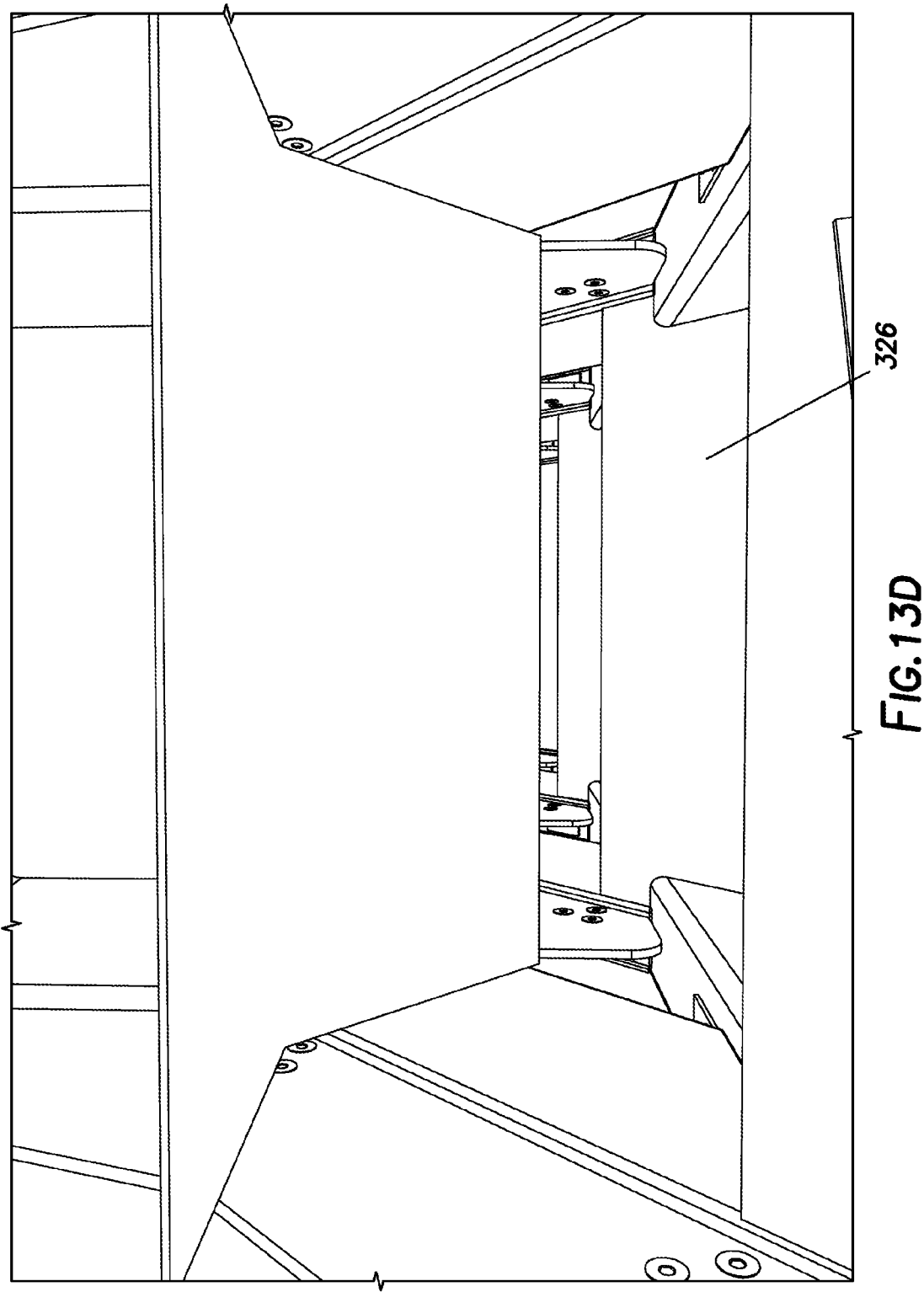

FIGS. 10C and 10D show a tote conveyor 1020' with a diverter (transfer device) 106' that jogs from left to right between parallel incoming and outgoing conveyor portions 1020*a,b*. The diverter 106' has a two strand crossband (or chain) 1030 extending between the incoming and outgoing conveyor portions. The diverter 106' in this case includes a cam portion 1031*b* that rotates to the bottom so cases 108 can pass over on the rollers 530*a*.

The cases 108 may be diverted from the conveyor portion 1020*a* to the other conveyor portion 1020*b* for sorting by rotating the crossbands 1030. As the case 108 passes from conveyor 1020 and arrives at the diverter 106' along the conveyor portion 1020*a*, the case 108 is driven by crossbands 1030 laterally from a position in alignment with the conveyor portion 1020*a* to a position in alignment with the conveyor portion 1020*b* to complete the transfer. Positioned photo eyes sensing arrival of the case 108 to a particular position provide feedback to a controller that may be used to determine optimum time for the crossband rotation to occur.

The figures herein depict specific configurations of crossbands with cam portions, but others may be provided. For example, the cam portions may be on one or more conveyor belts or crossbands across a portion of a handling system. The crossbands may be of various dimensions (e.g., width, height, length, etc.). Where more than one crossband is provided about a portion of a handling system, the cam portions on adjacent crossbands may be of the same or different sizes/shapes. Variations in geometry are permitted to achieve the desired movement.

The crossbands may be made of one or more materials movably disposable about the diverter for transferring cases. The material on at least the portion of the crossband in contact with the rollers 530*a* may be a lower friction material that travels past on the crossband without significant wear or drag. For example, the cam portion of the crossbands can be of various materials to grip the cases with varying desired affects. A top of the crossband may be made of a material that grips items for movement and a bottom off the crossband may be made of a material with a lower coefficient of friction to move easily of the roller material. High grip or high friction surfaces may tend grip the cases and accelerate or push the cases from the side for high transfer performance. Less grip may give the ramp area more slip to slide under and raise the cases before carrying off to one side. Diverting left or right of case flow may be controlled by direction of rotation of the crossbands. The crossbands may prevent wedging between the rollers 530a under heavy weight conditions. The crossbands may be used with or without pulleys, bushings, bearings or wear strips.

Multi-Level Sorters

FIGS. 11A-14B show various configurations of multi-level sorters 314, 1314 in multi-level (or stacked) configurations usable for sorting and receiving the cases 108. FIGS. 11A-12D show a handling system including the conveyor unit 304' and the multi-level sorter 314 in a multi-feed configuration with stacked conveyor levels 320a-c having multiple diverters vertically stacked to feed into the same bin 326. FIGS. 13A-14B show another multi-level sorter 1314 in a multi-drop configuration with a single conveyor level with each diverter feeding to multiple stacked bins 1326. Each of these multi-level sorters 1314 has multiple levels and/or multiple bins 326. Inclined (fixed) offramps 328, 1328 may be provided to pass the cases 108 into the bins 326.

As shown in the multi-level conveyor configuration of FIGS. 11A-11D, the multi-level sorter 314 may be positioned adjacent one or more outlets of conveyors and/or conveyor units, such as the conveyor unit 304 of FIGS. 3A-3B to receive the cases 108. The conveyor unit 304' may be a multi-level conveyor unit 304' similar to the conveyor unit 304' of FIGS. 3A and 3B. In this version, the conveyor unit 304' includes an inlet 1123 leading to conveyors 320a-c. The inlet 1123 may be another conveyor unit that feeds cases onto the various conveyors 320a-c. The conveyors 320a-c lead to different levels of the multi-level sorter 314.

The multi-level sorter 314 may be the same as shown in FIGS. 3A-3B, and is shown with optional diverters 106. The multi-level sorter 314 may include multiple individual multi-level sorters 314. Each multi-level sorter 314 includes the frame 325 with stacked bin conveyors 324a-c. Each stacked bin conveyor 324a-c includes diverters 106 to divert cases 108 from the bin conveyors 324a-c into bins 326. The frame 325 may define one or more layers for supporting one or more conveyors 324a-c. The conveyors 324a-c may include one or more diverters 106 therealong. The bins 326 may be positioned adjacent the conveyors 324a-c and/or diverters 106 to receive the cases 108 therefrom. The offramps 328 may optionally be provided from one or more of the diverters 106 and/or conveyors 324a-c to feed into the bins 326. The offramps 328 may have flat, slanted surfaces for sliding the cases 108 into the bins 326. The offramps 328 may also have sides extending vertically above the slanted surfaces to guide the cases 108 into the bins 326.

The diverters 106 may be stacked along layers of the conveyors 324a-c to feed into a common bin. As shown, one diverter 106 on each of the three levels feeds into one bin 326, thereby providing for multiple conveyor lines feeding into the same bin. The arrangement of multiple diverts aligned with multiple bins at multiple locations allows for a multi-feed sort arrangement. By multiplying the number of diverters along the conveyor and/or number of conveyors with corresponding bins aligned therewith, the capacity for sorting cases is increased by the number provided.

FIGS. 13A-13D show another example multi-multi-level sorter 1314 with diverter (movable) offramps 1328 to open and close sorting paths to the desired bins. As shown in the stacked bin configuration of FIGS. 13A-13D, the multi-level sorter 1314 includes a frame 1325 supporting a single conveyor 1320 at a top of the frame 1325 with diverters 106 therealong. Multiple bins 1326 are supported on the frame 1325.

The frame 1325 includes bin supports 1340 extend from vertical legs of the frame to support the bins 326 thereon. The bin supports 1340 are positioned at various horizontal and vertical positions along the frame 1325 to support the bins 1326. The bin supports 1340 may be stacked to align vertically with each of the diverters 106 to receive the cases 108 therefrom, thereby providing another multi-sort configuration for feeding from one conveyor and one diverter into multiple bins. By multiplying the number of diverters along the conveyor and multiple bins aligned therewith, the capacity for sorting cases is increased by the number of bin units provided.

Diverter offramps 1328 are also optionally provided to define a surface to slidingly pass the cases 108 into the bins 326. The diverter offramps 1328 may be an angled plate rotatably positioned on the bin supports 1340 and pivotally movable thereabout. As shown on the right side of FIG. 13C, the diverter offramps 1328 may remain in a sliding position between the frame 1325 and the bin 326 until activated to move to a pass through position. In the pass through position on the left side of FIG. 13C and in FIG. 13D, the diverter offramp 1328 is rotated away from one bin for access to a lower bin 326 therebelow to pass the cases into the lower bin 326. By selectively activating the diverter offramps 1328 (e.g., by a controller), the cases 108 may be passed from the diverter 106 to select bins at different levels along the frame 1325.

Figure 14A:
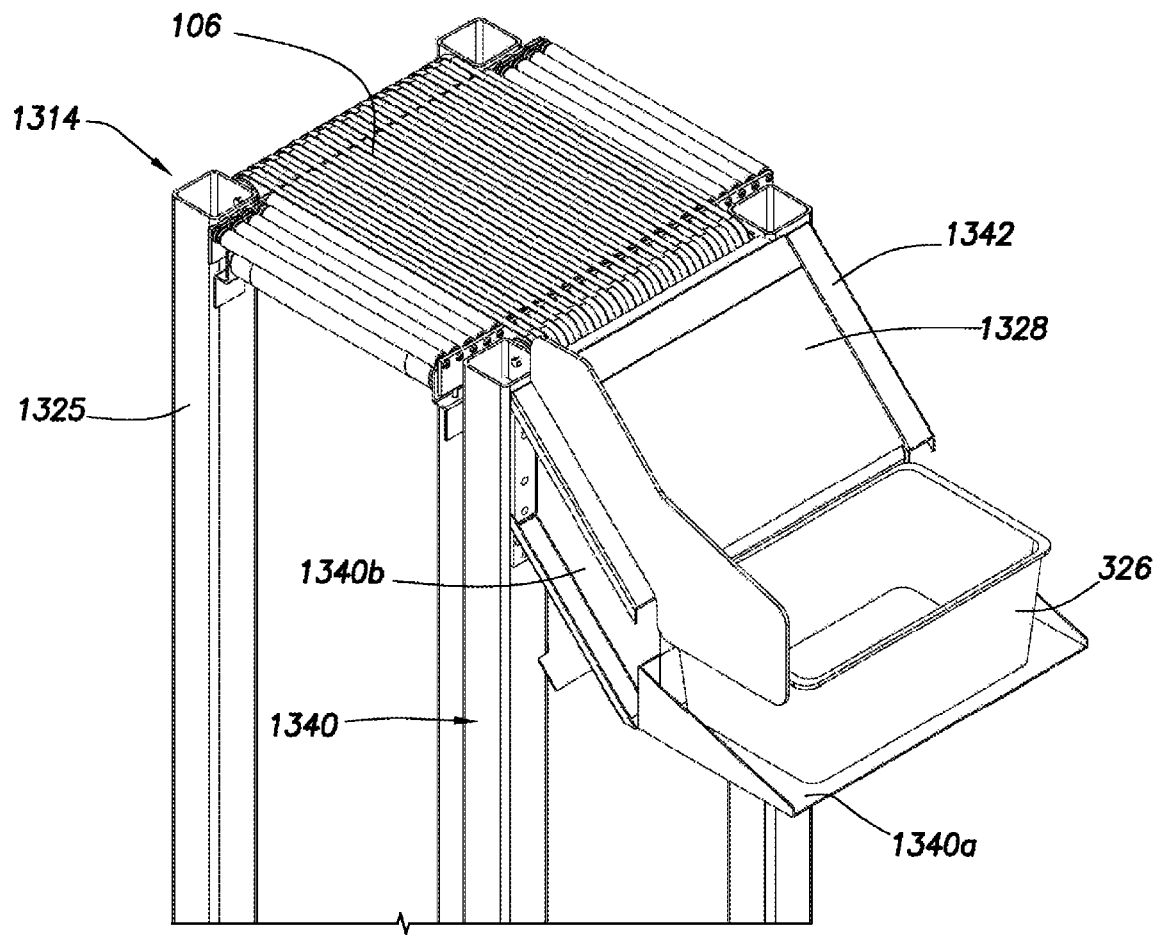
FIGS. 14A-14B show detailed views of a bin assembly.
Figure 14B:
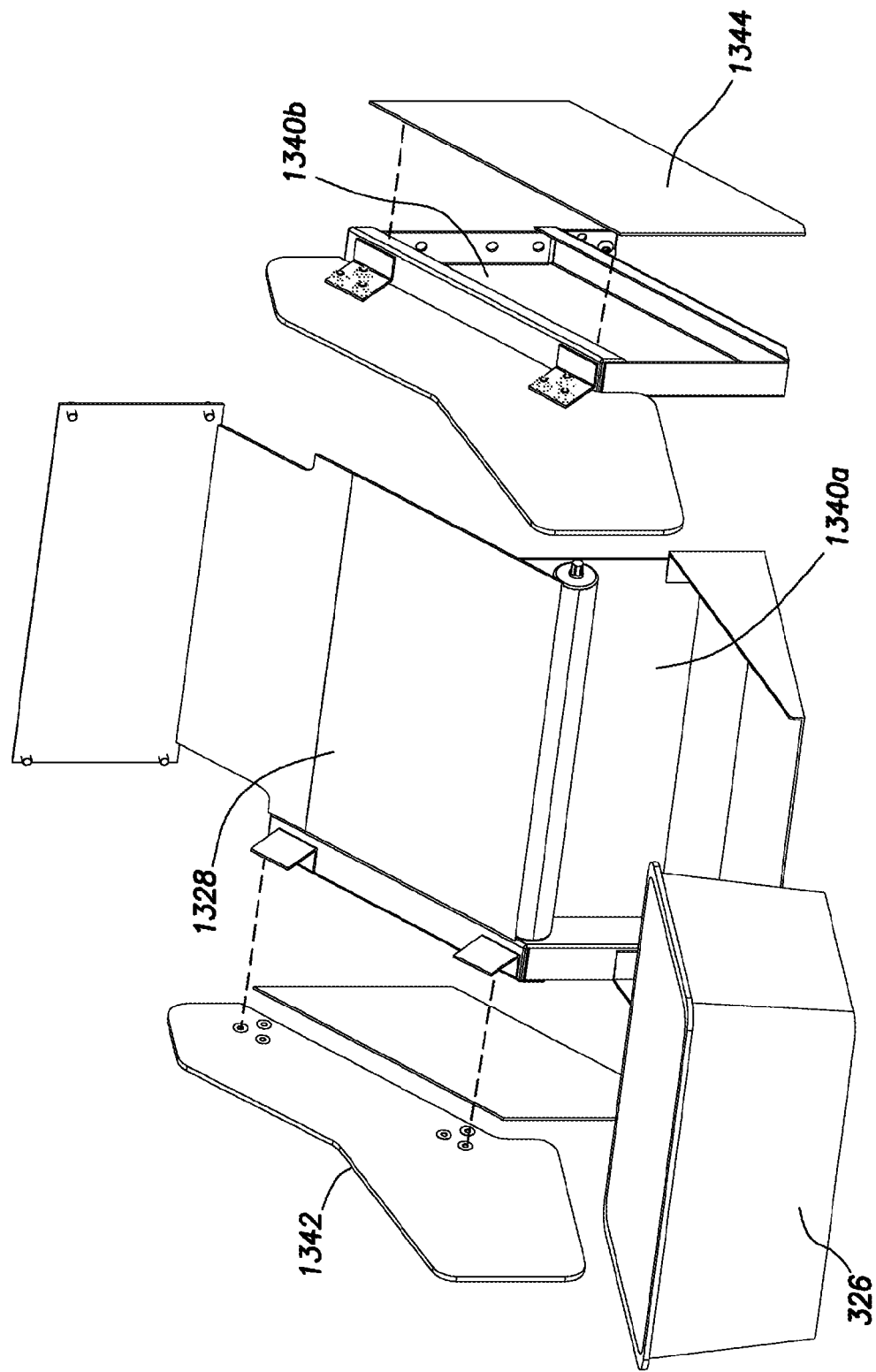

FIGS. 14A and 14B show detailed view of a multi-level sorter 1314 having a single bin 326. The multi-level sorter 1314 includes the frame 1325, a single diverter 106, a single bin support 1340 and the offramp 1328. The frame 1325 may be positioned adjacent a conveyor unit and/or another multi-level sorter to provide a modular configuration of the handling system. As shown in these views, the bin support 1340 includes a bin platform 1340a and a support arm 1340b to support the bin 326. The offramp 1328 includes a rotatable, angled plate having a sliding surface portion movable between the sliding position and the pass through position. As also shown, the multi-level sorter 1314 may also be provided with guides 1342 and side plates 1344 on opposite sides of the offramp 1328 to guide the cases 108 into the bin 326.

The multi-level sorters may have one or more levels of conveyors, diverters, and/or bins. The multi-level sort may include modular units connectable to provide any number of bin locations for receiving the cases. The levels may be aligned or staggered to receive the cases from one or more diverters. The multiple configurations offer multiple diversion paths for passing certain cases to certain bins. The multiplicity may be used, for example, to provide multiple feed paths to increase sorting speeds and/or multiple locations to increase number of sort bins. By stacking the levels, increased sorting capabilities may be provided within a limited footprint within the facility.

The various multi-multi-level sorter provided herein may have mechanisms, such as the internal offramp, that acts as a transfer mechanism to divert the cases from a main stream of flow (e.g., from the diverter) into select bins. The diverter may employ stacked conveyors and/or stacked bins with sorting capabilities that enable multiple sortation streams of the cases to divert into common sort destinations. These sorters may be used with conventional conveyors that handle the mainstream flow. Such conventional conveyors may at times have diversion devices with large cross-sections which may cause long distances between stacked diverters creating issue with clearance of goods and/or fall distance into the bin, tote or box receiving the sorted items.

The multi-level configurations may be used to increase capture locations to provide high sort rate binning with or without increasing velocity. In some cases, high sort rates may be achieved by increasing the velocity of the items moving on the mainstream feeding the divert stations. Faster speeds may mean more items per minute, and may apply forces in the sortation system and on items moved at increased velocities. Reaction times may become very short and preciseness of timing and controls may become more critical. One method to alleviate issues with high velocities is by extending the distances and make turns and curves more gradual (i.e. using more space). Time for weighing and scanning objects may reduce, thereby creating issues with miss reads and accuracy. High sort rate high velocity systems may be costly because of the cost and number of components required to function at high rates with any level of dependability. Additionally, light weight and irregular shaped items may require additional time to process.

Multi-binning may be used to increase capacity for capturing cases at offload locations. This may be done by using parallel sortation. This may be used to provide multiple items flowing from a single conveyor and sorting to separate destinations. Stacked transfer modules may be used to increase high sort rates while using less floor space. The system may be configured with the goal of increasing dependability because the laws of physics are not pushed, providing redundancy, increasing uptime because of the parallel redundancy, reducing speeds, increasing scan and weigh performance because there is more time to take multiple samples at slower velocities, and enhanced handling of non-standard items such as products in bags or parcels, among others.

The stacked configuration may be used to reduce the profile of the device, and may be modular to allow multiple units to be mounted vertically in a common frame. The multi-level sorter may include one or more vertical stand-alone frame units (modules) to be used singularly or combined with other units. The stacked module may operate as a single transfer module in a similar vertical frame in that it can operate as a stand alone or operate in conjunction with other standard modules to create various material handling configurations with existing conveyor equipment, such as the handling system and/or related equipment of US patent/applications previously incorporated by reference herein. The multi-level sorters may be added to increase sortation rates by providing parallel sortation operations to a common sort location.

The multi-level configurations may be used with various advanced diverting capabilities. Split paths and multiple bins may also be used to divert, thereby eliminating time for lifts for diverting at the same location which can create bottlenecks. Equipment for lifting wheels, belt & pulley assemblies may be provided, or optionally eliminated to reduce space and provide a lower profile. The crossband may rotate quickly to divert the items. Positive engagement by crossbands with raised surfaces may be used to grab parts and accelerate them quickly. Requirements to stop mainstream rollers or slow down items for transfer may not be required.

While the embodiments are described with reference to various implementations and exploitations, it will be understood that these embodiments are illustrative and that the scope of the inventive subject matter is not limited to them. Many variations, modifications, additions and improvements are possible. For example, various combinations of one or more of the features provided herein may be used.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

Insofar as the description above and the accompanying drawings disclose any additional subject matter that is not within the scope of the claim(s) herein, the inventions are not dedicated to the public and the right to file one or more applications to claim such additional invention is reserved. Although a very narrow claim may be presented herein, it should be recognized the scope of this invention is much broader than presented by the claim(s). Broader claims may be submitted in an application that claims the benefit of priority from this application.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A crossband of a diverter of a conveyor, the diverter comprising conveyor rollers and drive rollers, the conveyor rollers rotatably aligned with a path of the conveyor, each of the drive rollers positioned at opposite ends of the conveyor rollers, a top of the conveyor rollers defining a conveyor surface for passing cases therealong, the crossband comprising:
   a continuous loop rotatably encircling the drive rollers, the continuous loop passing between a pair of the conveyor rollers, the continuous loop having an inner surface rotatably positioned about the drive rollers and an outer surface shaped to drivingly engage the cases, the continuous loop comprising a base portion having a thickness and at least one cam portion having an increased thickness, the outer surface along the base portion positioned below the conveyor surface, the outer surface along the at least one cam portion extending a distance above the conveyor surface, the at least one cam portion having an incline at a contact end thereof shaped to engage with a bottom of the cases to lift and push the cases as the continuous loop advances about the drive rollers whereby the cases are selectively diverted from the conveyor;
   wherein the continuous loop is unitary.

2. The crossband of claim 1, wherein the continuous loop comprises a high friction material.

3. The crossband of claim 2, wherein the high friction material is positioned along contact surfaces of the continuous loop.

4. The crossband of claim 1, wherein the inner surface of the continuous loop comprises a toothed surface shaped to engage with a toothed surface of the drive rollers.

5. The crossband of claim 1, wherein the continuous loop has a radial cross-section shaped to fill a space between adjacent ones of the conveyor rollers.

6. The crossband of claim 1, wherein the continuous loop has a flat outer surface, a flat bottom surface, and tapered side surfaces, the tapered side surfaces shaped to receivingly engage the conveyor rollers.

7. The crossband of claim 1, wherein a width of the crossband along the cam portion is greater than a width of the crossband along the base portion.

8. The crossband of claim 1, wherein a length of the cam portion is greater than at least one of a length and a width of the cases.

9. A diverter of a handling system for transporting cases about a facility, the handling system having at least one conveyor, the diverter comprising:
   a frame positioned adjacent the at least one conveyor;
   conveyor rollers rotationally supported by the frame and aligned with the at least one conveyor, a top of the conveyor rollers defining a conveyor surface;
   drive rollers positioned at opposite ends of the conveyor rollers and rotationally supported by the frame; and
   crossbands positioned between the conveyor rollers, the crossbands rotatable in a direction transverse to the conveyor rollers, each of the crossbands comprising:
      a continuous loop rotatably encircling the drive rollers, the continuous loop passing between a pair of the conveyor rollers, the continuous loop having an inner surface rotatably positioned about the drive rollers and an outer surface shaped to drivingly engage the cases, the continuous loop comprising a base portion having a thickness and at least one cam portion having an increased thickness, the outer surface along the base portion positioned below the conveyor surface, the outer surface along the at least one cam portion extending a distance above the conveyor surface, the at least one cam portion having an incline at a contact end thereof shaped to engage with a bottom of the cases to lift and push the cases as the continuous loop advances about the drive rollers whereby the cases are selectively diverted from the at least one conveyor;
      wherein the continuous loop is unitary.

10. The diverter of claim 9, wherein the frame comprises a plurality of horizontal levels, each of the plurality of horizontal levels having the conveyor rollers, the drive rollers, and the crossbands thereon.

11. The diverter of claim 9, further comprising O-ring bands rotationally supported about the conveyor rollers, the O-ring bands rotationally driven by a line shaft.

12. The diverter of claim 9, wherein the frame is one of connected to and integral with the conveyor.

13. The diverter of claim 9, wherein the at least one conveyor comprises another diverter.

14. The diverter of claim 9, wherein the at least one cam portions of the crossbands are one of aligned and staggered.

15. A method of transporting cases about a facility, the method comprising:
   positioning a diverter about a conveyor of the facility, the diverter comprising a frame, conveyor rollers rotatably aligned with a path of the conveyor, drive rollers positioned at opposite ends of the conveyor rollers, and crossbands positioned between the conveyor rollers, the crossbands rotatably encircling the drive rollers, the conveyor rollers defining a conveyor surface, each of the crossbands comprising:
      a continuous loop having an inner surface rotatably positioned about the drive rollers and an outer surface shaped to drivingly engage the cases, the continuous loop comprising a base portion having a thickness and at least one cam portion having an increased thickness, the outer surface along the base portion positioned below the conveyor surface, the outer surface along the at least one cam portion extending a distance above the conveyor surface, the at least one cam portion having an incline at a contact end thereof shaped to engage with the cases;
      wherein the continuous loop is unitary;
   advancing a portion of the cases along a conveyor path of the conveyor and onto the diverter; and
   selectively diverting a portion of the cases away from the conveyor path by selectively rotating the crossbands to engage the at least one cam portion with the cases and advance the portion of the cases.

16. The method of claim 15, wherein the advancing comprises rotationally driving the conveyor rollers.

17. The method of claim 15, wherein the selectively diverting comprises rotating the crossbands with the drive rollers.

18. The method of claim 15, wherein the selectively diverting comprises selectively diverting the cases at an angle by selectively staggering the cam portions of the crossbands.

19. A crossband of a diverter of a conveyor, the diverter comprising conveyor rollers and drive rollers, the conveyor rollers rotatably aligned with a path of the conveyor, each of the drive rollers positioned at opposite ends of the conveyor rollers, a top of the conveyor rollers defining a conveyor surface for passing cases therealong, the crossband comprising:
   a continuous loop rotatably encircling the drive rollers, the continuous loop passing between a pair of the conveyor rollers, the continuous loop having an inner surface rotatably positioned about the drive rollers and an outer surface shaped to drivingly engage the cases, the continuous loop comprising a chain with segments connected thereto, the segments shaped to define a base portion having a thickness and at least one cam portion having an increased thickness, the outer surface along the base portion positioned below the conveyor surface, the outer surface along the at least one cam portion extending a distance above the conveyor surface, the segments defining an incline at a contact end and a decline at an opposite thereof shaped to engage with a bottom of the cases to lift and push the cases as the continuous loop moves in either direction about the drive rollers whereby the cases are selectively diverted from the conveyor.

20. The crossband of claim 19, wherein the continuous loop comprises a chain with segments connected thereto, the segments along the at least one cam portion having the increased thickness.

* * * * *